United States Patent [19]

Knowles et al.

[11] Patent Number: 5,828,049
[45] Date of Patent: *Oct. 27, 1998

[54] CODE SYMBOL READING SYSTEM WITH MULTI-PORT DIGITAL SIGNAL DECODER

[75] Inventors: Carl Harry Knowles, Moorestown; George Kolis, Pennsauken, both of N.J.

[73] Assignee: Metrologic Instruments Inc., Blackwood, N.J.

[*] Notice: The term of this patent shall not extend beyond the expiration date of Pat. No. 5,343,027.

[21] Appl. No.: 878,325

[22] Filed: Jun. 18, 1997

Related U.S. Application Data

[63] Continuation of Ser. No. 657,220, Jun. 3, 1996, Pat. No. 5,686,717, which is a continuation of Ser. No. 467,608, Jun. 6, 1995, abandoned, which is a continuation of Ser. No. 297,620, Aug. 29, 1994, abandoned, which is a continuation of Ser. No. 819,700, Jan. 13, 1992, Pat. No. 5,343,027, which is a continuation of Ser. No. 424,303, filed as PCT/US86/02717 Dec. 12, 1986, Pat. No. 5,081,342.

[51] Int. Cl.⁶ .................................... G06K 7/10
[52] U.S. Cl. ............................ 235/462; 235/436
[58] Field of Search ..................... 235/462, 454, 235/466, 436, 440, 449, 470, 463, 383

[56] References Cited

U.S. PATENT DOCUMENTS

| | | | |
|---|---|---|---|
| 3,796,863 | 3/1974 | Nickl et al. ............................. | 235/462 |
| 4,074,852 | 2/1978 | Wescott et al. ......................... | 235/463 |
| 4,538,072 | 8/1985 | Immlet et al. .......................... | 235/472 |
| 4,542,528 | 9/1985 | Sanner et al. .......................... | 235/462 |
| 4,578,570 | 3/1986 | Mazumder et al. ..................... | 235/463 |
| 4,761,544 | 8/1988 | Poland ................................... | 235/462 |
| 5,343,027 | 8/1994 | Knowles et al. ........................ | 235/462 |
| 5,468,947 | 11/1995 | Danielson et al. ..................... | 235/472 |

*Primary Examiner*—Donald T. Hajec
*Assistant Examiner*—Michael G. Lee
*Attorney, Agent, or Firm*—Hopgood, Calimafde, Kalil & Judlowe, LLP

[57] ABSTRACT

A bar code symbol reading system having a laser scanner, and a multi-port digital signal decoder capable of decoding digital signals produced from various types of scanning devices including, for example, high-speed counter top scanners, low-speed hand-held scanners, wand scanners, light pen scanners, and magnetic card scanners. The digital signal decoder includes a plurality of data input ports for receiving digital input signals produced from the various scanning devices. The digital signal decoder also includes common digital signal and data processing circuitry for processing the digital input signals and digital data so as to produce, as output, decoded symbol data. In addition, the digital signal decoder further includes an output data port for providing the decoded symbol data to a host device operably connected to the digital signal decoder. In the illustrative embodiment, the digital signal decoder is realized using VLSI circuit and microprocessor technology.

46 Claims, 8 Drawing Sheets

CODE SYMBOL READING SYSTEM WITH MULTI-PORT DIGITAL SIGNAL DECODER

This is a continuation of application Ser. No. 08/657,220 filed Jun. 3, 1996, now U.S. Pat. No. 5,686,717, which is a continuation of application Ser. No. 08/467,608, filed Jun. 6, 1995 abandoned; which is a continuation of application Ser. No. 08/297,620, filed Aug. 29, 1994, now abandoned; which is a continuation of application Ser. No. 07/819,700 filed Jan. 13, 1992, now issued as U.S. Pat. No. 5,343,027; which is a continuation of application Ser. No. 07/424,303 filed Jun. 6, 1989, now issued as U.S. Pat. No. 5,081,342; which is a national phase filing of PCT application Ser. No. PCT/US86/02717 filed Dec. 12, 1986.

FIELD OF THE INVENTION

This invention relates generally to the processing of bar code data received from scanning devices, and more particularly to the processing of input data from various types of scanners reading a wide variety of bar codes and other digital data.

BACKGROUND ART

As is known, several types of scanning devices for reading bar codes are presently available. These include slot scanners in extensive use in supermarkets and other type of retail outlets, hand held scanners and light pen scanners. The data from these scanners must be processed to enable the information to be decoded by data processors and other types of equipment.

Bar codes comprise bar and space symbols, with the identification of whether each symbol is a bar or a space and the width of each bar or space (i.e., the interval between a bar-to-space or space-to-bar transition and the next transition) providing the information content of the code, e.g., the alpha/ numerics which the code represents.

The printed bar code is first scanned by the beam of a light emitting device, i.e., laser, light emitting diode, etc. The light beam may be swept automatically across the code, as is the case with slot scanners or hand-held scanners or may be manually swept across the code, as is the case with light pens or wands. In either case, the scanning device includes light responsive components, such as photocells, to detect the light beam reflected off of the code. The light responsive means produce electrical signals corresponding to sensed symbols of the code. These signals are then processed and decoded.

Processing the bar code consists essentially of first detecting the occurrence of a bar-to-space transition or a space-to-bar transition, and then determining the interval between the transition and the next transition. A high frequency source is used to generate a series of pulses which are counted, and the total count determines the interval between the transitions (i.e., the width of the bar or space detected by the scanner). The digital counts representing the interval between transitions and the "sign" of the interval (i.e., whether the interval represents a bar or a space symbol) are then sent to a decoding device which converts the information to the original numerical and/or alphabetic representation of the bar code which has been read.

For processing the data from a slot or counter top scanner an internal frequency of forty megahertz (40 MHz) or twenty megahertz (20 MHz) is required. Occasionally a frequency as low as 10 MHz is most efficient. Processing of hand held scanner data is usually performed using frequencies of 5 or 2.5 MHz with 1.25 MHz occasionally used. For a light pen much lower frequencies are employed, ranging from an average of approximately 78 KiloHertz (KHz) down to 9.76 KHz.

Various types of bar codes are presently in use. The most commonly used bar code is the Universal Product Code, referred to as UPC. UPC is a universal code of the strictly numerical type and is in prevalent use for retailing purposes. Other codes include: (1) "EAN" which is the European equivalent of the UPC.; (2) "Code 39" which is an alpha-numeric bar code which is machine readable and is standard with the federal government for warehousing and inventory purposes; (3) The "I 2 of 5" code which is an interleaved numeric code and; (4) "Codabar" which is an early version of a numeric code with a limited number of other symbols, such as dollar sign, dash, etc. used mostly in the photo-processing field and for library codes.

Other codes which are highly specialized and not in prevalent use are the "Code 128" which includes a complete ASCII set and the "Plessey" code, "Code 93", and "Code 11".

As will be appreciated by those skilled in the art, bar code spacing can also vary, depending on the type of material the bar code is placed upon. For example, with a rough material, such as cardboard, the printing of the code is low density, that is, the bars and spaces are relatively wide. Such low density codes tend to decrease the frequency of detection of transitions of the code. For other materials which allow for high resolution or density printing, i.e., bars and spaces which are relatively thin, the detection frequency can be higher. Thus, even with a specific bar code, the spacing between the bars and the spaces can vary considerably, which in turn changes the frequency required to detect and process the code.

Two types of decoders are in prevalent use. One such decoder is a fixed program decoder, such as the National Cash Register integrated circuit decoder chip No. 6-1005415/NCR-8415 used to decode the UPC/EAN bar codes. Another type of decoder is the so-called programmable processor decoder. That type of decoder is programmable so that it can be used to decode the UPC and EAN codes, as well as a wide variety of other codes.

As will be appreciated by those skilled in the art, the fixed program decoder operates considerably faster than the programmable processor decoder. On the other hand, the fixed program decoder, being specifically designed for decoding a specific code, is therefore inflexible, whereas the programmable processor decoder can be programmed to decode a wide variety of codes as well as provide other desirable functions, such as frequency selection and error detection.

Heretofore, previous devices have not been able to operate with all types of scanning devices (such as countertop scanners, hand-held scanners and light pens or wands). Moreover, such devices do not have the flexibility to process bar code data by automatically selecting, from a large number of available frequencies, those digitizer frequencies which are more efficient for the specific information being read. Further still, prior art devices are not suitable for operation with more than one type of decoder (i.e., they cannot operate with both a fixed program (hard-wired) decoder and a programmable processor decoder).

DISCLOSURE OF THE INVENTION

In accordance with one preferred embodiment the invention provides a device for the processing of bar code data provided by various types of bar code scanning devices, such as slot or hand-held scanners and light pens and wands.

In accordance with another aspect of the invention the device provides for the processing of a wide variety of bar code data.

In accordance with yet another aspect of the invention the device provides for processing bar code data which can digitize such data using a wide variety of digitizing frequencies.

In accordance with yet another aspect of the invention the device provides for processing bar code data which generates a large number of frequencies and enables the automatic selection and use of a frequency which is most efficient for processing the particular data.

In accordance with yet another aspect of the invention the device provides for the processing of bar code data which can enable the cross checking of the digitization of such data for accuracy by decoding such data by different means.

DESCRIPTION OF THE INVENTION

Figure 1:
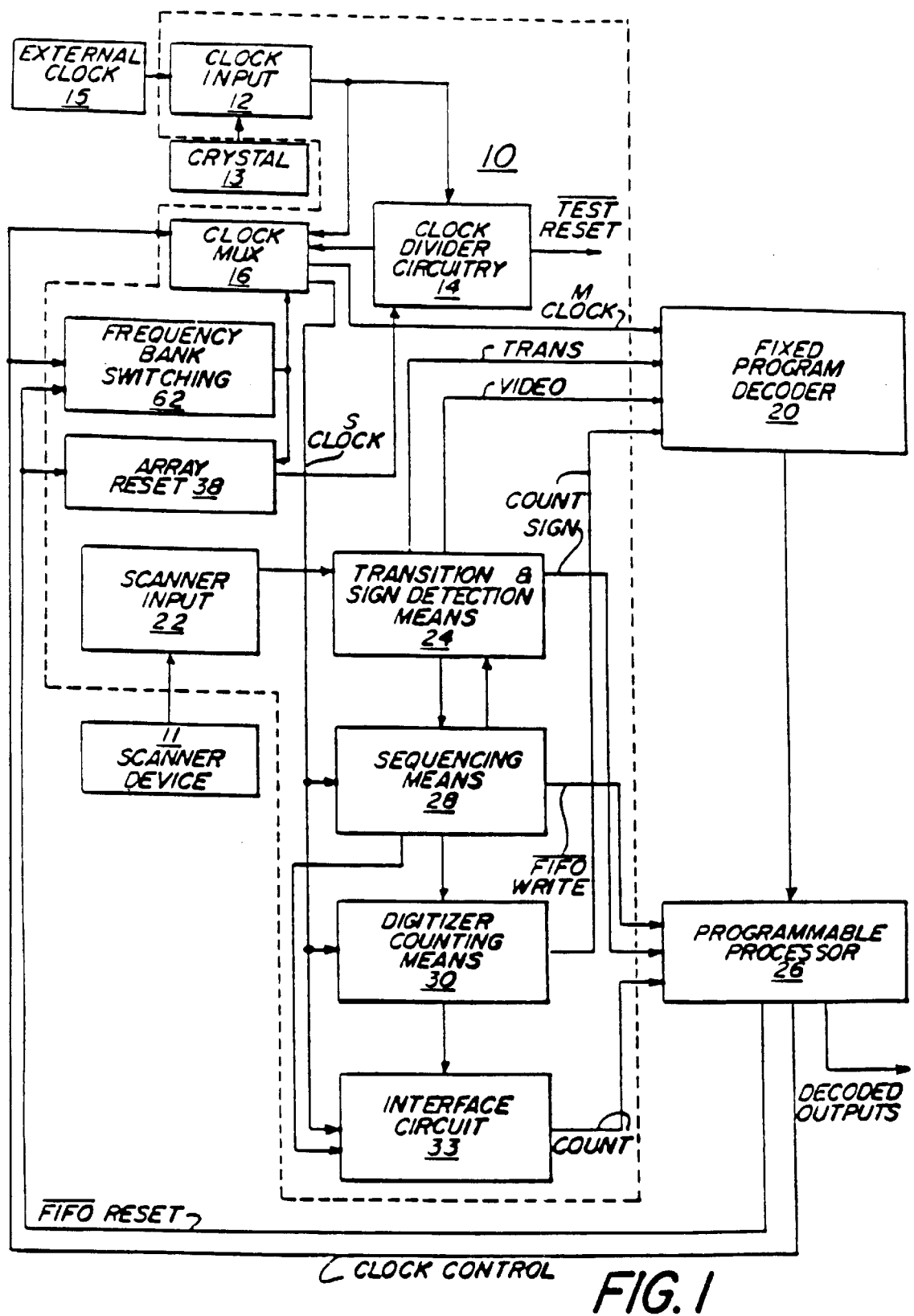
FIG. 1 is an over-all block diagram of the basic elements of the device and the interconnections between them.

Referring now in greater detail to the various figures of the drawing wherein like reference characters refer to like parts, there is shown in FIG. 1 an overall block diagram of the digitizer/sequencer device 10. As is conventional, a bar or line above a symbol or term in this description indicates a low level or inverse signal.

The digitizer/sequencer device 10 receives bar code information at its scanner input circuit 22 from all types of conventional scanner devices 11. The device 10 serves to process the input information and produces a digital count signal representing the width of the bar and space symbols of the bar code, a "sign" signal representing whether the digital count is a bar or space, and a signal indicating that a transition in the bar code has occurred (i.e., bar-to-space or space-to-bar). These signals are provided by the device to a fixed program decoder 20, such as the heretofore identified integrated circuit chip for UPC decoding and to a programmable processor 26 for decoding any type of code which has been programmed into the processor, including the UPC code, if desired. The programmable processor 26 includes a first-in, first-out (FIFO) memory or buffer (not shown) at its input for holding the information received from device 10 until the processor 26 is ready to decode it. The FIFO memory is required because processor 26 operates asynchronously with regard to device 10.

In order to permit the device 10 to process inputs from all types of scanners, the device includes means, to be described later, for generating a plurality of operating frequencies. The programmable processor 26, in turn, provides control signals to the device 10 for the selection of the optimum frequencies for the processing and decoding of the input (scanner) information.

Thus, the device 10 performs several important functions. It provides a plurality of frequencies by dividing down a frequency from a digital clock source, and it multiplexes those frequencies so that an optimum frequency can be chosen to time and control itself and to provide a clock input to a the fixed decoder 20 to decode a first code, e.g., the UPC code. The programmable processor 26 automatically generates control signals to select the optimum frequencies.

Further, the device 10 processes the inputs from the bar code scanner to detect transitions in the bar code and to digitize the interval between the transitions through the use of a counter. The fixed program decoder 20 receives the transition information and the digital counts from the device 10, as does the programmable processor 26.

The device 10 includes sequencer means 28, to be described later, which steps the device through a predetermined sequence each time a transition occurs in the bar code input.

Referring to FIG. 1, the overall operation of the digitizer/sequencer device 10 will be described. Any type of bar code scanner device 11, or other reading device providing a digital signal, such as a magnetic card reader, is arranged to be connected to the scanner input circuit 22 of device 10. The timing of the operation of device 10 is accomplished by means of a train of timing pulses. Clock input 12 provides that train of pulses. The pulse train is also used for timing the operation of the fixed program decoder 20, and for operating counters in the device 10 to obtain a digital count for determining the width of the bar or space symbol being scanned.

The clock input 12 is provided from an external fixed frequency source 13, e.g., a 40 MHz crystal, or another external clock 15 to produce the pulse train. The output of the clock input circuit 12 is provided to the clock divider circuitry 14. That circuit includes dividers for successively dividing the frequency of the clock pulses by a factor of two to produce a plurality of clock frequencies, as will be described in detail later. This plurality of clock signals is provided to a multiplexer, clock mux 16. As shown in FIG. 1, the 40 MHz clock input signal is also provided directly to the clock mux 16.

The clock mux 16 selects the desired output frequencies for the device 10 based upon control signals received from clock control circuitry in the programmable processor 26 and in associated circuitry (as will be described later). The output of the clock mux 16 comprises two clock signals, namely, an S clock signal and an M clock signal. The S clock signal provides the basic timing for the device 10, as well as the input to digital counters (to be described later), while the M clock signal provides the basic timing signals for the fixed program decoder 20.

The processing of the input (bar code) data provided from any scanner device 11 will now be described. The scanner input circuit 22 provides output signals which represent the detected bar code signal to be processed and are provided to the transition and sign detecting means 24. That circuit detects the transition from a bar to a space or a space to a bar from the input signals provided thereto, and also determines whether the symbol occurring before the transition is a bar or a space. Thus, the transition and sign detecting means 24 delivers a signal, TRANS, to indicate the occurrence of a transition, and a signal, VIDEO, to indicate the "sign" of the symbol (i.e., whether a bar or a space was detected). These signals are provided to the fixed program decoder 20. In addition, the transition and sign detector 24 provides another signal bearing the "sign" information. That signal is referred to as the "SIGN" signal and is provided to a first-in, first-out (FIFO) memory (not shown) which serves as the input of programmable processor 26. The transition and sign means 24 also provides a signal (to be described later) to the sequencing means 28 to commence operation of the sequencing means 28.

The sequencing means 28 steps the device 10 through a predetermined number of steps which begin at the occurrence of each symbol transition and which will be described in detail later. Sequencing means 28 provides a $\overline{\text{FIFO write}}$ signal to the FIFO input of the processor 26 at the proper time to enable it to accept data from the device 10. The sequencing means 28 also supplies a signal to the transition and sign means 24 which allows it to generate the TRANS signal and also record the "sign" of the new interval to be digitized. The sequencing means 28 also provides input signals to digitizing counting means 30 so that the starting and stopping of the counters, occurring with the detection of each transition, is properly sequenced.

The counting means 30 also receives an input signal from the clock mux 16 (S Clock). This signal runs the counters at the selected rate when they are enabled by the sequencing means 28.

The clock mux 16, the sequencer means 28 and the counting means 30 all supply signals to the interface circuit 33 which enables it to properly pass the digitized count data to the FIFO in the programmable processor 26.

As will be described later, the clock mux 16 is arranged to provide two banks of available frequencies for the device to use, namely, an upper and a lower bank. The selection of frequencies from the upper bank or the lower bank is determined by a frequency bank switching means 62. The frequency bank switching means 62 also provides an input to an array reset 38 which provides a signal to reset the clock divider 14 on command. The specifics of this command will be described later. The clock divider circuitry 14 also generates a $\overline{\text{TEST reset}}$ signal by inverting the array reset signal. The $\overline{\text{TEST reset}}$ signal resets the remainder of the device 10. The command which initiates this reset condition is normally generated by a testing device (not shown) connected to device 10 and used to test it upon its fabrication.

Figure 2:
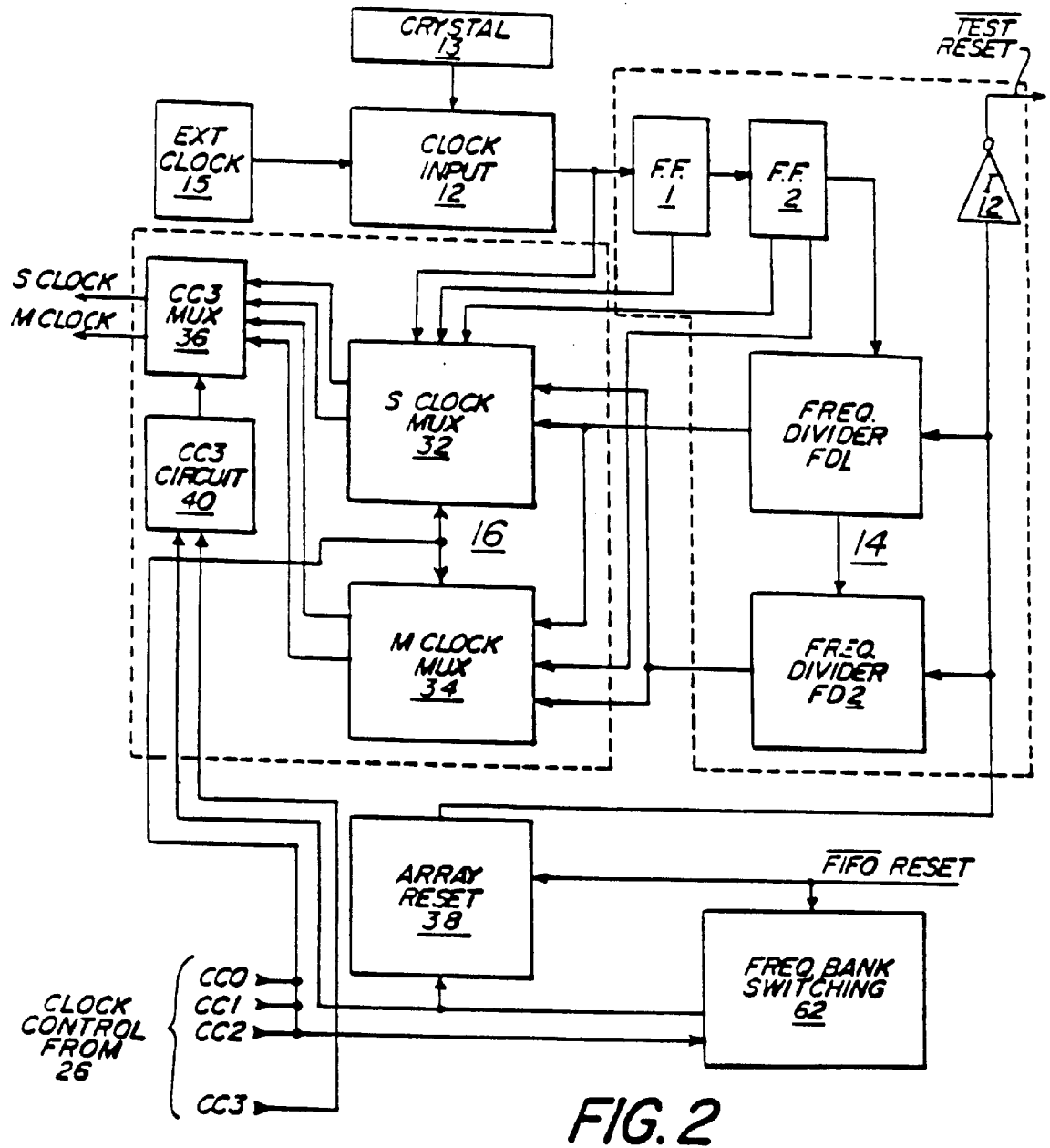
FIG. 2 is a block diagram of the frequency generation and multiplexing components of the device shown in FIG. 1.
Figure 3:
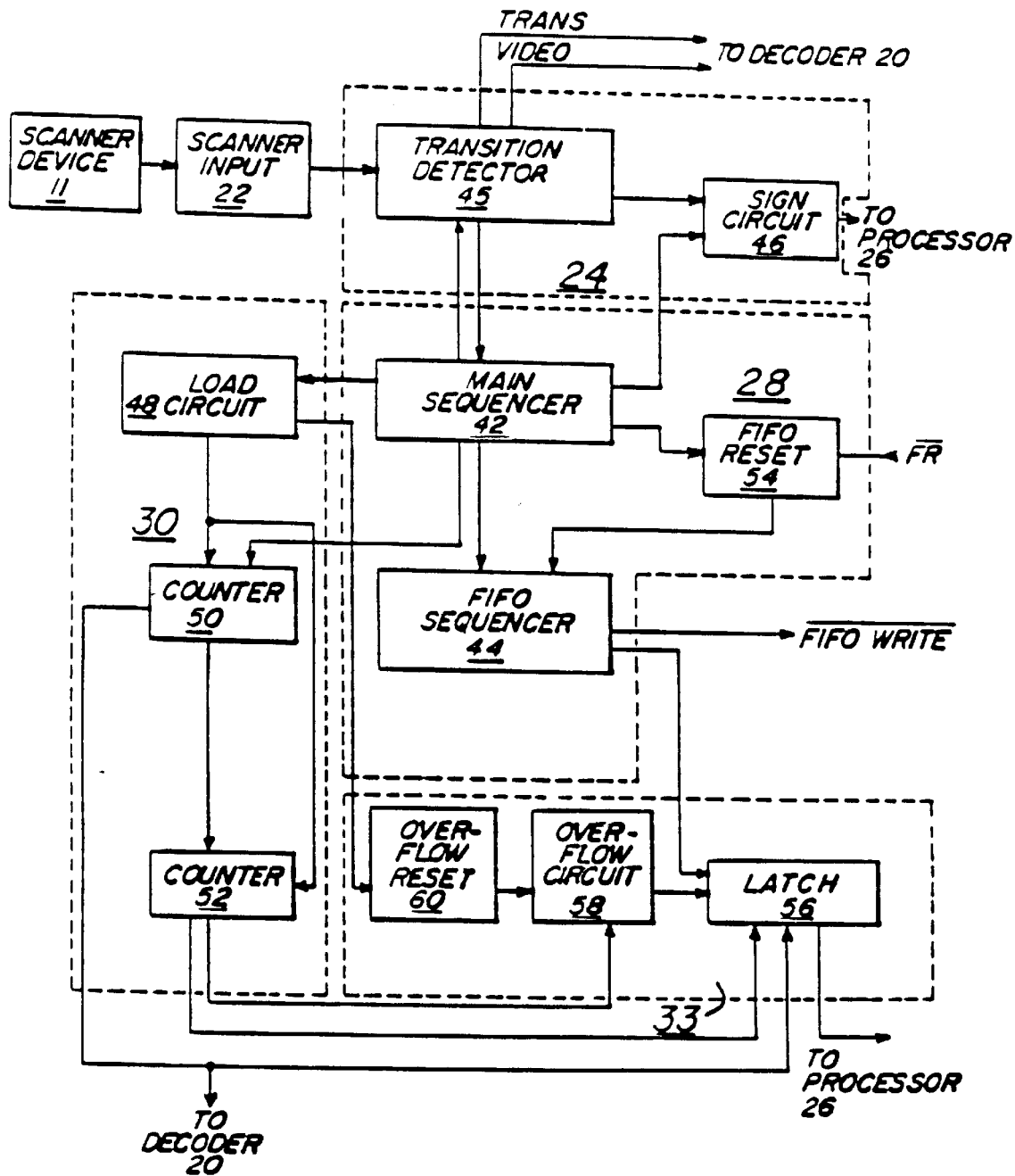
FIG. 3 is a block diagram of the transition detector, sequencer, and digitizing components of the device shown in FIG. 1.

FIGS. 2 and 3 show the digitizer/sequencer device 10 in greater detail. As can be seen in FIG. 2 the clock mux 16 comprises an S clock multiplexer mux 32, an M clock multiplexer mux 34, a CC3 multiplexer 36 and a CC3 circuit 40. These multiplexers and circuits serve to select one of a plurality of operating frequencies for optimum processing of the scanner device input data. The operation of these circuits will be described in detail later.

The 40 MHz output clock signal from the clock input circuit 12 is provided to a flip-flop FF1 in the clock divider circuitry 14 and to the S clock mux 32. The flip-flop FF1 divides the 40 MHz frequency in half so that a 20 MHz signal is transmitted to a second flip-flop FF2 and to the S clock mux 32. The flip-flop FF2, in turn, divides the 20 MHz input signal in half, so that a 10 MHz signal is sent to a frequency divider FD1 and to the S clock mux 32 and to the M clock mux 34.

The frequency divider FD1 divides the input frequency signal of 10 MHz successively eight times by a factor of two, thereby creating eight additional frequencies. The lowest frequency produced by frequency divider FD1 is directed into a second frequency divider FD2 which further divides that signal by a factor of two successively four additional times. The outputs of the frequency dividers FD1 and FD2 are connected as respective inputs to the S clock mux 32 and the M clock mux 34. The interconnections between the frequency dividers and the clock muxs and the frequencies which are delivered to the clock muxs will be described in detail later. Suffice it to say for now that the M clock mux 34 receives the same frequencies as the S clock mux 32 except for the two highest frequencies (e.g., 40 MHz and 20 MHz) but also receives two additional low frequencies (e.g., 4.88 KHz and 2.44 KHz), since the highest input frequency to S clock mux 32 is 40 MHz, whereas the highest input frequency to the M clock mux 34 is 10 MHz.

As discussed previously, the output of the S clock mux 34 provides the internal clock and timing for the device 10 and for the digitizer counting means 30, while the output of the M clock mux 34 provides the clock for the fixed program decoder 20.

The controls for the operation of the S clock mux 32 and the M clock mux 34 will now be described. To that end, the muxs 32 and 34 are controlled by three digital clock control signals CC0, CC1, and CC2. These signals are transmitted from the programmable processor 26 to effect the selection of one set of frequencies out of the seven sets of frequencies supplied to the upper bank multiplexers. A fourth or highest order bit for controlling the frequency selection by the multiplexers may also be supplied by the programmable processor 26. Thus, processor 26 is connected to a CC3 control circuit 40. That circuit, in turn, controls a CC3 multiplexer 36 which provides the multiplexing of an additional six sets of frequencies supplied to the lower bank multiplexers. Therefore, the four control signals, CC0, CC1, CC2 and CC3, provide the capability of selecting one set of 13 frequencies for the operation of device 10 and the fixed program decoder 20.

As will be described in detail later, if the fourth control signal CC3, from the processor 26 is not available, clock control signals CC0, CC1 and CC2 plus a $\overline{\text{FIFO reset}}$ signal from the processor 26 can be used to internally generate a CC3 signal. The $\overline{\text{FIFO reset}}$ signal from the processor 26 is connected to an array reset circuit 38 (FIGS. 1 and 2). The array reset signal 38 serves to clear the frequency dividers FD1 and FD2 and to generate a $\overline{\text{TEST reset}}$ signal. The $\overline{\text{TEST reset}}$ signal clears the remaining circuitry of device 10, to enable its testing after fabrication. The array reset 38 also receives a signal from frequency bank switching 62 (to be described later) which primes the array reset for operation. The operation of the frequency bank switching means 62 will also be described later. Suffice now to say that it enables the internal generation of a CC3 signal when such a signal is not available from the programmable processor 26.

Referring now to FIG. 3, the operation of the transition and sign detecting means 24 and the sequencing means 28 will be described. The transition and sign detecting means 24 basically comprises a transition detector 45 and a sign circuit 46. The output of the scanner input circuit 22 is connected to the transition detector 45. The transition detector 45 generates the TRANS signal and the VIDEO signal, respectively, indicating that a transition has occurred and whether the symbol prior to the transition was a bar or a space. These signals are provided to the fixed program decoder 20. The decoder uses the signals to provide an output signal indicative of the contents of the code scanned, as is conventional.

The sequencing means 28 basically comprises a main sequencer 42, a FIFO sequencer 44 and a FIFO reset circuit 54. The transition detector 45, upon the occurrence of a transition, outputs a signal to the main sequencer 42 to begin the controlled sequence of operations. The main sequencer 42 then counts the next eight S clock pulses in sequence, and at the occurrence of selected counts provides signals for the operation of the device 10. The transition detector 45 also provides an input to the "sign" circuit 46. A signal is also provided to the circuit 46 from the main sequencer 42 to assure that the SIGN output signal (indicating the "sign" of the symbol just scanned) is provided to the FIFO in the programmable processor 26 at the proper time. The detailed operation of the main sequencer 42 will be described later.

The main sequencer 42 also generates a signal to operate a load circuit 48 in the digitizing counting means 30. The load circuit serves to preload one counter and reset the other counter, in the digitizing counting means 30. To that end, as can be seen in FIG. 3, the digitizing counting means 30 is comprised of a counter 50 and a counter 52 and the previously mentioned load circuit 48. The counters 50 and 52 are operated by the S clock signals (not shown in FIG. 3). In particular, the load circuit 48 presets the counter 50 with a count of eight to account for the eight clock pulses which have occurred prior to the completion of the eight counts by the main sequencer 42. After the 8th count, the counter 50 is enabled by a signal from the main sequencer 42 to begin its count.

The sequencing means 28 includes the heretofore mentioned main sequencer 42 as well as a FIFO sequencer 44 and a FIFO reset circuit 54. The FIFO sequencer will be described later. Suffice for now to state that it serves to enable the FIFO in the programmable processor 26 to accept data from device 10 at the appropriate time. Thus, the FIFO sequencer 44 controls the transfer of the count information from the counters 50 and 52 to the processor 26 by providing a $\overline{\text{FIFO write}}$ signal to the FIFO in processor 26. The main sequencer 42 provides a signal which enables the FIFO sequencer 44 to begin its sequence. The FIFO reset circuit 54 resets the FIFO sequencer 44 upon receipt of a $\overline{\text{FIFO reset}}$ signal from the processor 26 and a signal from the main sequencer 42.

The FIFO sequencer 44 is also connected to a latch 56. The latch 56 holds and stabilizes the output counts from the counters 50 and 52 until the counts are provided to the programmable processor 26.

As will be described in detail later, the counters 50 and 52 are each four stage counters which are connected together to enable 256 counts of 0–255. The FIFO in the programmable processor 26 can only accept the count of 255 or less. Therefore, when the counters 50 and 52 overflow (i.e., have a total count higher then 255) an overflow circuit 58, which is connected to the carry output of counter 52, operates to lock the maximum count of 255 into the latch 56. The overflow circuit 58 forms a part of an interface circuit 33 (FIG. 1). That circuit basically comprises the aforementioned latch 56 and overflow circuit 58 as well as an overflow reset circuit 60. In order to clear or reset the overflow circuit 58, the overflow reset circuit 60 is provided. That circuit is connected to the load circuit 48 of the digitizing counting means 30. Thus, the overflow circuit 58 is reset by the overflow reset circuit 60 when the load circuit 48 is activated.

Count information used for determining the duration of the symbol between transitions is provided by counter 50 to the fixed program decoder 20. In particular, the decoder 20 has its own internal counter which operates off of the fourth stage of the counter 50. Thus, the counter 50 supplies the four least significant digits of the count to the decoder 20, while the decoder itself supplies the remaining more significant digits with its own counter to determine the duration of the symbol between transitions of the code.

The detailed operation of the digitizer/sequencer device 10 will now be described in conjunction with FIGS. 4A and 4B and 5A, 5B and 5C. Prior to launching into the description, however, the symbols employed in the detailed wiring diagrams of FIGS. 4 and 5 will be explained. The open headed arrows represent input and output pins of the device. Open headed arrows pointing inward represent a pin with an incoming signal and open headed arrows pointing outward represent a pin with an outgoing signal. The large circles represent internal chip connections. The small circles represent internal bonding connections. Closed arrows denote signal direction.

The device 10 may be formed of plural discrete components, but is preferably formed as a very large scale integrated circuit (VLSI) chip. It may be packaged into a standard 28 pin package or a standard 40 pin package. Those inputs or outputs which relate exclusively to the 40 pin package are denoted by parentheses.

Figure 4A:
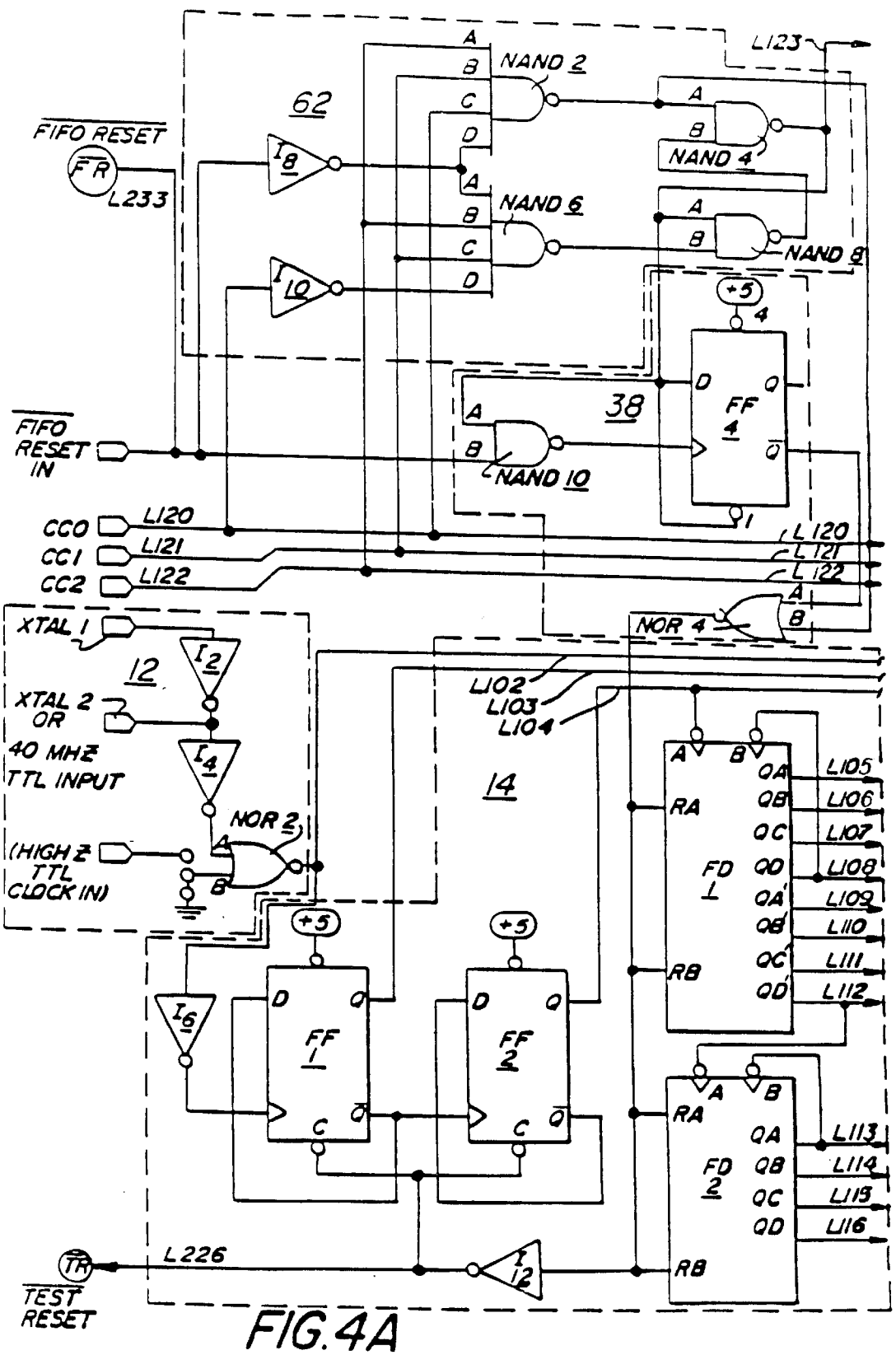
FIG. 4A is a schematic diagram of the frequency dividers, frequency bank switching, and array reset circuits of the device shown in FIG. 2.

To explain the protocol used for a 40 pin package as opposed to a 28 pin package, reference should be made to the details of the clock input circuit 12 shown in FIG. 4A. Note that input B of NOR gate NOR 2 is connected to ground by a bonding terminal. For a 40 pin package, a high impedance (Z) TTL clock input can be accepted by breaking the bond between the middle terminal (small circle) which is connected to the input B of Norgate NOR 2 and the lower terminal (small circle) which is connected to ground. The middle terminal (small circle) is then connected to the upper terminal (small circle) which is connected, in turn, to the pin accepting the high impedance clock input. Thus, a 28 pin package will not accommodate an external clock input whereas a 40 pin package will. The same method for connecting additional pins in the 40 pin package, as opposed to the 28 pin package, is used throughout this specification.

Details of clock input 12, the clock dividers 14, the frequency and bank switching circuit 62, and the array reset circuit 38 will now be described by reference to FIG. 4A. As can be seen, the clock input 12 comprises the heretofore identified NOR gate NOR 2 and a pair of inverters I2 and I4. The 40 MHz crystal 13 is connected across pins XTAL 1 and XTAL 2 which shunt inverter I2. The crystal and inverter I2 form a 40 MHz oscillator. The oscillator's output, which is the clock signal, is passed through inverter I4 and is connected to input A of NOR gate NOR 2. It should be noted that input B of NOR gate NOR 2 is grounded in the 28 pin package. As explained previously, an external clock may be provided to input B of NOR gate NOR 2 for the 40 pin package by breaking the bond between input B and ground and connecting input B to the high impedance clock input.

The output of NOR gate NOR 2 is a 40 MHz clock signal and is provided to clock dividers 14 and to clock mux 16 by a line L102. The operation of clock mux 16 will be described in detail later in conjunction with FIG. 4B. The 40 MHz clock signal is also connected to the input of an inverter I6. The output of I6 is connected to the clock input pin of flip-flop FF1. The Q output of flip flop FF1 is connected to the clock mux 16 by line L103. The flip-flop FF1 produces an output frequency which is one-half the input frequency by virtue of the connection of its $\overline{Q}$ terminal to its D input. Therefore, with an input frequency of 40 MHz, the frequency at the output terminal Q of the flip-flop FF1 on line L103 is 20 MHz. The flip-flop's preset terminal is connected to plus five volts bias.

The $\overline{Q}$ terminal of the flip-flop FF1 is connected to the clock input pin of flip-flop FF2. This flip-flop is also connected to operate as a two-to-one divider by connecting its $\overline{Q}$ terminal to its D terminal. Thus, the output of flip flop FF2 at its Q terminal is one-half the frequency of the input, namely 10 MHz, and is provided by line L104 to the clock mux 16.

Thus far, the 40 MHz clock input signal has been divided twice by a factor of two so that 40 MHz, 20 MHz and 10 MHz signals appear on lines L102, L103, L104, respectively. These signals are provided to clock mux 16. The frequency dividers FD1 and FD2 are conventional circuits which include two sections, A and B, to divide the input signal successively by factors of two. Thus, they further divide the signal appearing at the Q output of flip flop FF2, e.g., 10 MHz, to obtain additional frequencies for device 10. In particular, the output of the flip-flop FF2 is connected to the input A of frequency divider FD1. The first section A of frequency divider FD1 provides outputs at QA, OB, QC and QD, respectively. These pins are connected to lines L105, L106, L107 and L108, respectively, which are, in turn, connected to the clock mux 16. Thus, the signals appearing on lines L105, L106, L107 and L108, respectively, are 5 MHz, 2.5 MHz, 1.25 MHz and 625 KHz, respectively. The QD terminal of divider frequency divider FD1 is connected to the B input of FD1 thereby supplying a 625KHz frequency input to the B section of frequency divider FD1. The lower set of Q outputs at QA', QB', QC' and QD' are 312 KHz, 156 KHz, 78 KHz and 39 KHz, respectively. These signals appear on lines L109, L110, L111 and L112, respectively.

The QD' terminal of the frequency divider FD1 is connected the A input of the frequency divider frequency divider FD2. Thus, the 39 KHZ clock frequency at the pin is divided in half in frequency divider FD2 so that 19.5 KHz appears at terminal QA of FD2 on line L113 connected thereto. The QA terminal of frequency divider FD2 is connected to the B section input of frequency divider FD2. Thus, the input signal appearing at the pin is successively divided by a factor of two so that at terminal QB, line L114, a frequency of 9.75 KHz appears; at terminal QC, line L115, a clock frequency of 4.875 KHz appears; and at terminal QD, line L116, a clock frequency of 2.44 KHz appears. As stated previously, the outputs of FD1 and FD2, appearing on lines L105 through L116, respectively, are connected to clock mux 16.

The operational details of the circuitry of the frequency bank switching circuit 62 will now be described. As can be seen, circuit 62 comprises four NAND gates, NAND 2, NAND 4, NAND 6 and NAND 8, and two inverters I8 and I10. As will be described later, the S clock mux 32 and the M clock mux 34 of clock mux 16 each include two multiplexers, one handling an upper bank of frequencies and the other a lower bank. The frequency bank switching circuit 62 controls whether a frequency from the upper or the lower bank of each clock mux 32 and 34 is selected.

Figure 4B:
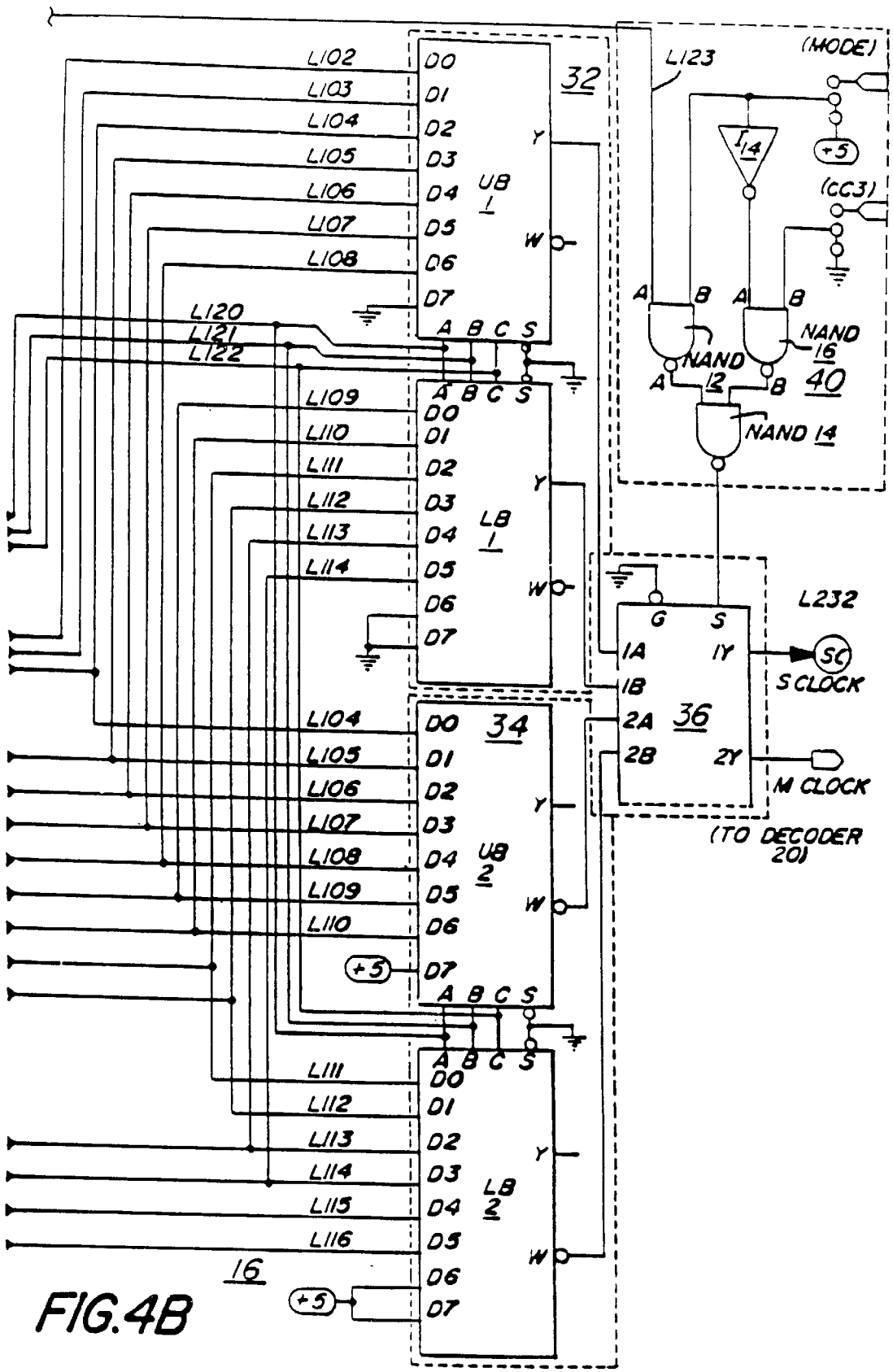
FIG. 4B is a schematic diagram of the multiplexers, and the multiplexer control circuitry of the device shown in FIG. 2.

Referring now to FIG. 4A, the binary clock control inputs CC0, CC1 and CC2, and which are generated by the processor 26, appear on lines L120, L121 and L122, respectively. These signals are provided to control the operation of the frequency bank switching circuit 62. They also are connected to clock mux 16, via lines L120, L121 and L122, for frequency selection (See FIG. 4B). In particular, when a high signal ("1") appears on each of the lines L120, L121 and L122, and a $\overline{FIFO\ reset}$ input signal is generated by the processor 26, the outputs of the lower banks of frequencies of the S clock mux 32 and the M clock mux 34 are selected. When clock control inputs CC0, CC1 and CC2 are all high, inputs A, B and C of NAND gate NAND 2 are high. The $\overline{FIFO\ reset}$ signal, a low signal ("0"), is provided to the input of the inverter I8. Therefore, the output of inverter I8 goes high making input D of NAND gate NAND 2 high. NAND gate NAND 2 is now enabled and its output goes low. The output of NAND 2 is connected to input A of NAND gate NAND gate NAND 4 which causes the output of NAND 4 to go high, thus generating the internal control clock CC3 signal. The high level at the output of NAND gate NAND 4 is connected to CC3 control circuit 40 via line L123 (FIG. 4B). It passes through this circuit if enabled (as will be explained later) and is applied to the CC3 mux circuit 36 to serve to select the output frequency of the lower banks of the S clock mux 32 and the M clock mux 34.

When the programmable processor 26 wishes to command the device 10 to switch from the lower bank frequencies back to the upper bank frequencies, it generates binary signals 0,1,1 on the clock control inputs CC0, CC1 and CC2 (lines L120, L121 and L122, respectively). The $\overline{FIFO\ reset}$ signal is supplied by the processor 26 causing NAND gate NAND 6 to provide a low output signal since all its inputs are high. In particular, the $\overline{FIFO\ reset}$ input which is a low is provided to the input of inverter I8. This makes the output of inverter I8 high. The output is connected to input A of NAND gate NAND 6 which makes it high. The low CC0 signal on line L120 is provided to the input of inverter inverter I10. The output of I10 thus goes high, making input D of NAND 6 high. The high level signal on CC1 on line L121 is provided to input C of NAND 6, which makes it high. The CC2 high level input on line L122 is provided to input B of NAND gate NAND 6 making it high. Thus, all four inputs of NAND gate NAND 6 are high which causes its output to go low. The output of NAND gate NAND 6 is connected to input B of NAND gate NAND 8. The low level at the input of NAND gate NAND 8 causes its output to go high. Since the output of NAND gate NAND 8 is connected to input B of NAND gate NAND 4, and since the output of NAND gate NAND 2, which is also high, is connected to input A of NAND gate NAND 4, NAND gate NAND 4 is enabled, whereupon a low signal appears at its output terminal, thereby removing the internal CC3 signal on line L123 and causing the device 10 to switch back to the upper bank frequencies of the S clock mux 32 and M clock mux 34, as will be described later.

The operation of the array reset circuit 38 will now be described. As indicated previously, the array reset circuit 38 resets the frequency dividers, FD1 and FD2, and generates a signal which is provided to the clock divider circuitry 14 to produce the $\overline{TEST\ reset}$ signal which resets the device 10 for test purposes. The array reset circuit 38 basically consists of a NAND gate NAND 10, a flip-flop FF4, and a NOR gate NOR 4. The circuit 38 operates when the programmable processor 26 places a high ("1") signal on lines L120, L121 and L122, and when two successive low level ("0") $\overline{FIFO\ reset}$ signals are generated by the processor 26. The FIFO reset signal is provided to input B at NAND gate NAND 10. The first FIFO reset signal causes the output of NAND gate NAND 4 to go high in the presence of all high signals on lines L120, L121 and L122. Since the output of NAND gate NAND 4 is connected back to the input A of NAND 10, both inputs to NAND 10 are high before the appearance of a second FIFO reset input signal. Therefore, the output of NAND gate NAND 10 is low. When the second FIFO reset signal occurs, the input B of NAND gate NAND 10 goes low causing the output of NAND gate NAND 10 to go high. This provides a high level signal to the clock input of flip-flop FF4 which causes the flip-flop FF4 to operate, whereupon the $\overline{Q}$ output terminal goes low. Since the $\overline{Q}$ terminal of FF4 is connected to input A of NOR gate NOR 4, and since input B of NOR gate is low at this time as it is connected to the output of NAND gate NAND 2, the output of NOR gate NOR 4 goes high.

The output signal from the array reset 38 is provided as an input to the clock divider circuitry 14. This signal serves to reset the dividers, FD1 and FD2 which form a portion of circuitry 14. In particular, the output of NOR gate NOR 4 is connected to reset input terminals RA and RB, respectively, of frequency divider FD1 and to reset input terminals RA and RB, respectively, of frequency divider FD2. This signal resets both frequency dividers. Additionally, the high signal at the output of NOR 4 is provided to the input of inverter inverter I12 to generate a low level signal at its output. That output is connected to the "clear" input terminals of flip-flops FF1 and FF2, respectively, thus clearing them. Therefore, all elements of the frequency divider circuitry 14 are placed in their reset state.

Further, the output pin of 112 produces a low level TESTreset signal which, as seen later, resets all the elements of the device for test purposes.

To summarize, a high level signal on CC0, CC1 and CC2 (corresponding to the decimal value 7) coupled with a FIFO reset signal switches the device 10 to the lower bank frequencies of the clock mux 32 and 34 while a low CC0 signal, and high CC1 and CC2 signals (a decimal 6) coupled with FIFO reset signal switches the device 10 back to the higher frequency banks of the clock multiplexers. The decimal value "7" clock control signal with two FIFO reset signals generates an array reset signal and a TESTreset signal.

The clock multiplexer circuitry 16 will now be described with reference to FIG. 4B. The clock multiplexer circuit mux 16 basically comprises the heretofore described S clock mux 32 and M clock mux 34 as well as the CC3 multiplexer mux 36 and an associated CC3 circuit 40. S clock mux 32 includes two 8-input to 1-output multiplexers, one of which, UB1, defines the upper bank of frequencies and the other of which, LB1, defines the lower bank. Similarly, M clock mux 34 has two 8-to-1 multiplexers, UB2 and LB2, defining an upper bank of frequencies and a lower bank of frequencies, respectively. The upper bank UB1 and the lower bank LB1 of S clock mux 32 are controlled by the CC0, CC1 and CC2 signals appearing on lines L120, L121 and L122, respectively, at terminals A, B and C, respectively. The strobe input S of multiplexer UB1 and LB1 is grounded. The input frequency signals to the upper bank multiplexer multiplexer UB1 appear on lines L102 through L108 (inputs D0 through D6, respectively). The input D7 of UB1 is grounded because a "1" on CC0, CC1 and CC2 is used not to select frequencies, but rather as indicated previously to generate an internal CC3 signal or to generate an array reset and TEST reset signal.

The signals on control inputs A, B and C of multiplexer multiplexer UB1 determine which of the frequencies appearing on D0 through D6 (lines L102–108, respectively) will appear at its Y output terminal. For example, if it is desired that the frequency on line L104 (e.g., 10 MHz) appearing at input D2 of UB1, is to be selected, a binary signal equal to a decimal 2 is provided on lines L120, L121 and L122. This requires that input A be low, input B be high and input C be low.

The multiplexer LB1 selects the frequencies from the lower bank frequencies for the S clock mux 32. Thus, multiplexer input D0–D5 are connected to lines L109 through L114, respectively, from the clock divider circuitry 14. Inputs D6 and D7 of multiplexer LB1 are grounded because a binary clock control signal equal to decimal 6 and a binary clock control signal equal to decimal 7 are used for switching between the upper and lower banks as previously described.

The M clock mux 34 uses the same clock control inputs on the lines L120, L121 and L122 as does the S clock mux 32. The multiplexer UB2 of M clock mux 34 selects a frequency from the upper bank frequencies provided at its input D0–D6. Plus five volts is applied to D7. For UB1, the inverse output W is used. Similarly, for LB2 the input frequencies appear at D0–D5 on lines L111 through L116, respectively. D6 and D7 are not used and are tied to a plus five volt signal level. Inverse W outputs are used for the M clock mux 34 because of timing requirements of the fixed program decoder 20.

In order to select whether the upper or lower bank clock frequency is used for device 10, the selected upper and lower bank frequency signals of S clock mux 32 are provided to a CC3 multiplexer mux 36. Thus, the output signals from clock mux 32 are provided as inputs 1A and 1B of CC3 mux 36, while the selected upper and lower bank frequencies of M clock mux 34 are provided to inputs 2A and 2B, respectively, of CC3 mux 36.

The CC3 mux 36 basically comprises a pair of two-to-one multiplexing circuits, each of which selects either the upper bank frequency signals or the lower bank frequency signals for the S clock and M clock. Thus, the selected frequency from the S clock mux 32 appears at the CC3 mux 36 output terminal 1Y while the selected frequency from the M clock mux 34 appears at the CC3 mux 36 output terminal 2Y. The selection of either upper or lower bank signals is effected by the signal appearing on the select input S of CC3 mux 36, in particular, if a high level signal appears on the input terminal a lower bank frequency is selected as the S clock signal and a lower bank frequency is selected as the M clock signal. If the signal on the S terminal is low, an upper bank frequency signal is selected for the S clock and an upper bank frequency is selected for the M clock.

The select input signal to the CC3 mux 36 is provided from the CC3 circuit 40 as can be seen in FIG. 4B. This circuit basically comprises three NAND gates, NAND 12, NAND 14, NAND 16, and an inverter I14.

The CC3 signal which appears on line L123 is connected to input A of NAND gate NAND 12. The input B of that gate is connected to plus five volts. Thus, when line L123 goes high, i.e., when switching to the lower bank frequencies of multiplexer LB1 and LB2 is desired, the input A of NAND gate NAND 12 also goes high. This causes the output of NAND gate NAND 12 to go low. Therefore, input A to NAND gate NAND 14 goes low. Both inputs on A and B of NAND gate NAND 16 are low since input B is directly connected to ground and input A is connected through an inverter I14 to plus five volts. This produces a high level signal at the output of NAND gate NAND 16.

Prior to line L123 going high, both inputs to NAND gate NAND 14 were high. Therefore, the output of NAND gate NAND 14 was low. When the CC3 signal on line L123 goes high, the input A for NAND 14 goes low causing the output of NAND gate NAND 14 to go high, whereupon the select or input terminal of the CC3 mux 36 goes high so that the lower bank frequencies are selected. When the CC3 signal goes low, the signal which appears on line L123 is provided to the input A of NAND gate NAND 12 which causes its output to go high which, in turn, causes the output of NAND gate NAND 14 to go low. This action switches the output of the CC3 mux 36 to select the upper bank frequency.

Figure 5A:
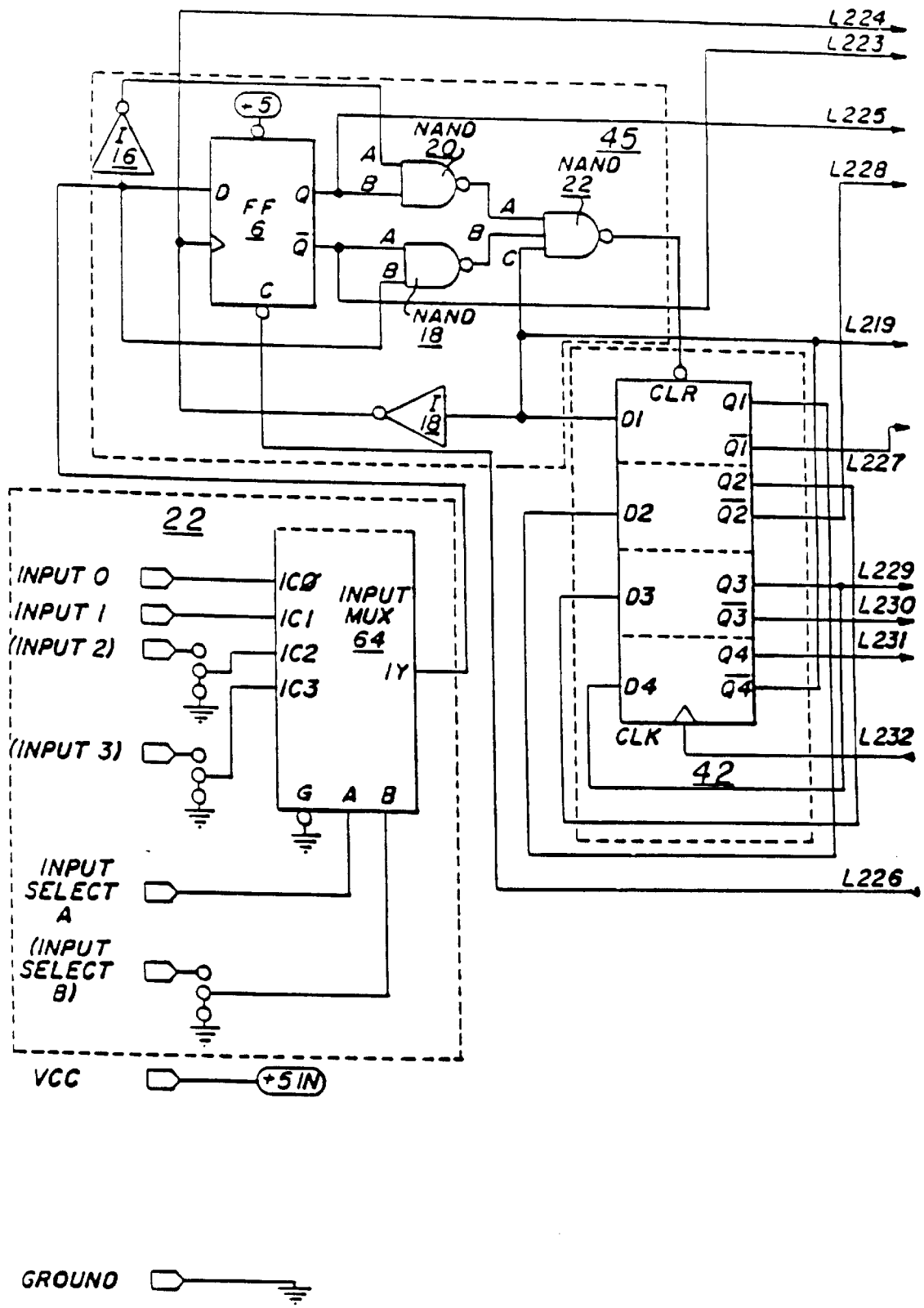
FIG. 5A is a schematic diagram of the input selector, transition detector, and main sequencer of the device shown in FIG. 3.

If a 40 pin package is used for the device 10, the CC3 signal may be directly applied to circuit 40, thereby eliminating the necessity for the frequency bank switching circuit 62 to generate an internal CC3 signal to select either the upper or lower bank frequencies. Thus, with a 40 pin package, when an input is provided at the terminal of CC3, the connection between input B of NAND gate NAND 16 and ground is broken and the pin is connected to the CC3 input terminal. A MODE input terminal is provided to select whether the CC3 internal signal or the external signal will be used. The connections between the input of inverter I14 and the input B of NAND gate NAND 12 are disconnected from plus five volts and then connected to the MODE input. If the MODE input is high, the internal CC3 signal is used. If the MODE signal is low, the external CC3 signal is enabled. This is because a low signal at the MODE input terminal causes the output of inverter I14 to go high, making input A of NAND 16 high. Therefore, when the external CC3 signal goes high, the output of NAND gate NAND 16 goes low. This output is connected to input B of NAND gate NAND 14. When input B of NAND gate NAND 14 goes low, the output of NAND gate NAND 14 goes high making the selector input S of the CC3 Mux 36 high, whereupon the lower bank frequencies are selected. When the CC3 signal is low, the output of NAND gate NAND 16 goes high causing the input B of NAND gate NAND 14 go to high. Since the MODE terminal signal level is low, the output of NAND gate NAND 12 remains high, therefore the input A of NAND gate NAND 14 is high. Since both inputs to NAND gate NAND 14 are high, the output of NAND gate NAND 14 goes low which makes the selector input of the CC3 Mux 36 low, whereupon the upper bank frequencies are selected. The S clock signal selected by CC3 mux 36 is provided on line L232 to the circuits of the device 10 (FIGS. 5A, B and C). The M clock signal is provided via a line (not shown) to the fixed program decoder 20.

The aforementioned description in conjunction with FIGS. 4A and 4B has covered the operation of the frequency division and frequency selection circuitry of the device 10. The sequencing and digitizing operation of device 10 will now be described by referring to FIGS. 5A, 5B and 5C. Referring now to FIG. 5A, the scanner input 22 includes an input multiplexer mux 64 which selects one of a plurality of four scanner inputs. Each scanner input can thus be provided with signals from a respective scanning device. The various scanner inputs are provided at the terminals designated. Input 0, input 1 and input select A are for the 28 pin version of the device 10. Input terminals 2, 3 and input select B (shown in parentheses) are used only with the 40 pin version. Input terminals 0 and 1 are connected to terminals IC0 and IC1 of the input mux 64, respectively. The input select A terminal is connected to terminal A of the mux 64. If the input select A is low, the IC0 signal appears at the mux 64 output IY. If input select A is high, the signal at IC1 appears at the output IY.

With a 40 pin package, input terminal IC2 is connected directly to input 2, and terminal IC3 is connected directly to input 3. Input select terminal B is connected to terminal B of the mux 64. If input select B is low and input select A is low, the IC0 input appears at the mux 64 output terminal IY. If input select A is high and input select B is low, the signal at IC1 appears at the mux 64 output IY. If input select A is low and input select B is high, the signal at IC2 appears at the output terminal IY. Finally, if both input selects A and B are high, the signal on IC3 appears at the output of mux 64 at terminal IY.

The output of multiplexer mux 64 carries the selected scanner information and provides it to the transition detector 45 in order to begin the processing of the input data to determine the occurrence of a transition in the bar code symbol. The transition detector 45 controls the main sequencer 42 and it provides signals indicating the occurrence of a detected symbol transition. The transition detector 45 basically comprises a pair of inverters I16 and I18, a flip-flop FF6 and three NAND gates, NAND 18, NAND 20 and NAND 22.

The scanner input 22 signal appears at terminal D of the flip-flop FF6, at the input of the inverter I16 and at the input B of the NAND gate NAND 18. Flip-flop FF6 does not change state until it is clocked by a signal received from the main sequencer 42 at its clock input. The generation of the signal, which is called a "commit" signal will be explained later.

The operation of the main sequencer circuit 42 occurs as follows: Normally a low level "clear" signal is applied to sequencer 42 from NAND 22. This "clear" signal sets the four outputs Q1–Q4 of the sequencer 42 to a low level. Assuming that the Q output of flip-flop FF6, which is connected to input B of NAND gate NAND 20, is high and the scanner input signal appearing on the D input of FF6 goes low, the output pin of I16 which is connected to input A of NAND gate NAND 20 goes high. Therefore, NAND gate NAND 20 is enabled and its output, which is connected to input A of NAND gate NAND 22, goes low. This causes the output of NAND gate NAND 22 to go high, removing the "clear" signal to the main sequencer 42 to enable it to operate in conjunction with the clock signal applied by line L232.

Alternatively, if the $\overline{Q}$ output pin of FF6 (which is connected to input A of NAND gate NAND 18) is high and the scanner input signal (which is provided to input B of NAND gate NAND 18) goes high, NAND gate NAND 18 is enabled and its output goes low. Thus, input B of NAND gate NAND 22 goes low causing a high signal to appear at its output pin which is, in turn, connected to the clear input of the main sequencer 42. Thus, the sequencer 42 is again enabled. Accordingly, either transition of the input signal from high to low (i.e., space-to-bar transition) or from low to high (i.e., bar-to-space transition) causes the removal of the "clear" signal from the main sequencer 42. With the "clear" signal removed, each input of the clock into the main sequencer 42 causes the sequencer to step through a successive one of the following eight steps. Q1-high, Q2-high, Q3-high, Q4-high, Q1-low, Q2-low, Q3-low and Q4-low. That sequence of operation is effected as follows:

The first clock pulse after the removal of the "clear" signal causes Q1 of sequencer 42 to go high. This signal is coupled back to terminal D2. This action primes the main sequencer 42 so that the next clock pulse causes its output 02 to go high. Q2 is connected back to input terminal D3. Thus, when Q2 goes high, the main sequencer 42 is primed to cause its Q3 output to go high with the next clock pulse. Similarly, Q3 is connected back to input terminal D4. Thus, when Q3 goes high, it causes input D4 to go high which primes the main sequencer so that at the next clock pulse its output 04 will go high. When Q4 goes high its complimentary output $\overline{Q4}$ which is connected back to terminal D1 goes low. This causes D1 to go low which primes the main sequencer 42 so the next pulse will cause its output Q1 to go low. When Q1 goes low, D2 becomes low which primes the main sequencer 42 to cause its output Q2 to go low with the next clock pulse. When Q2 goes low, D3 goes low thereby priming the main sequencer 42 to cause its output Q3 to go low with the next clock pulse. When Q3 goes low, output D4 goes low so that the next clock pulse causes Q4 to go low.

The "commit" signal discussed previously is generated at the fourth clock input to the sequencer. When complementary output $\overline{Q4}$ goes low with the fourth clock pulse input, the low level is provided to the input of inverter I18 of the transition detector 45, causing the output of inverter 118 to go high. This output is connected to the clock input of flip-flop FF6 causing it to go high. It should be noted that the signal level at the Q output of flip-flop FF6 does not change state until the fourth count of the sequence is completed. Therefore, until this occurs, the signal level at the Q output of flip-flop FF6 is indicative of the state of the incoming signal prior to the transition. The reason that the transition detector 45 does not react to the transition in the bar code input until after four clock pulses is to prevent operation on short signals (e.g., spurious noise signals). If the input signal reverts back to its previous state before the sequencer reaches the fourth count, NAND gate NAND 20 or NAND gate NAND 18 in conjunction with NAND 22 will cause the "clear" signal to be reapplied to sequencer 42 thereby resetting it. Thus, short "noise" signals are ignored. If, however, the sequencer 42 reaches the fourth count, the low level "commit" signal is applied to NAND gate NAND 22 input C forcing the sequencer 42 to run the full eight steps to completion.

As will be described later, the Q output of flip-flop FF6 is provided on line L225. This signal indicates the state of the incoming signal prior to the transition and is provided to the "sign" circuit 46. That circuit records whether a bar or a space existed, as will be described later in conjunction with FIG. 5B.

Figure 5B:
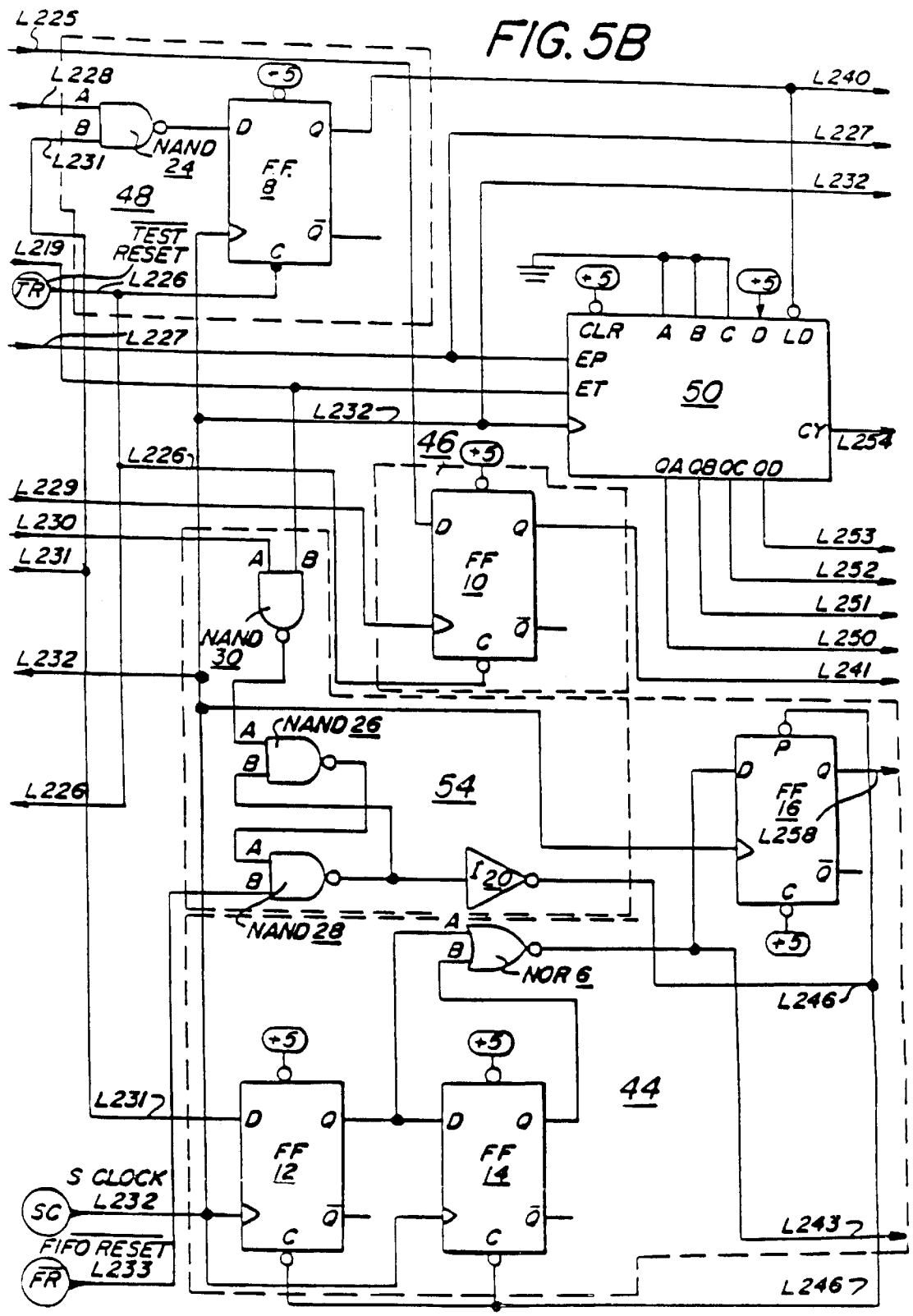
Fig. 5B is a schematic diagram of the FIFO sequencer and FIFO reset circuitry, the load circuitry, the sign circuitry and the counter which contributes the lower 4 bits of the 8 bit digitized count as shown in FIG. 3.
Figure 5C:
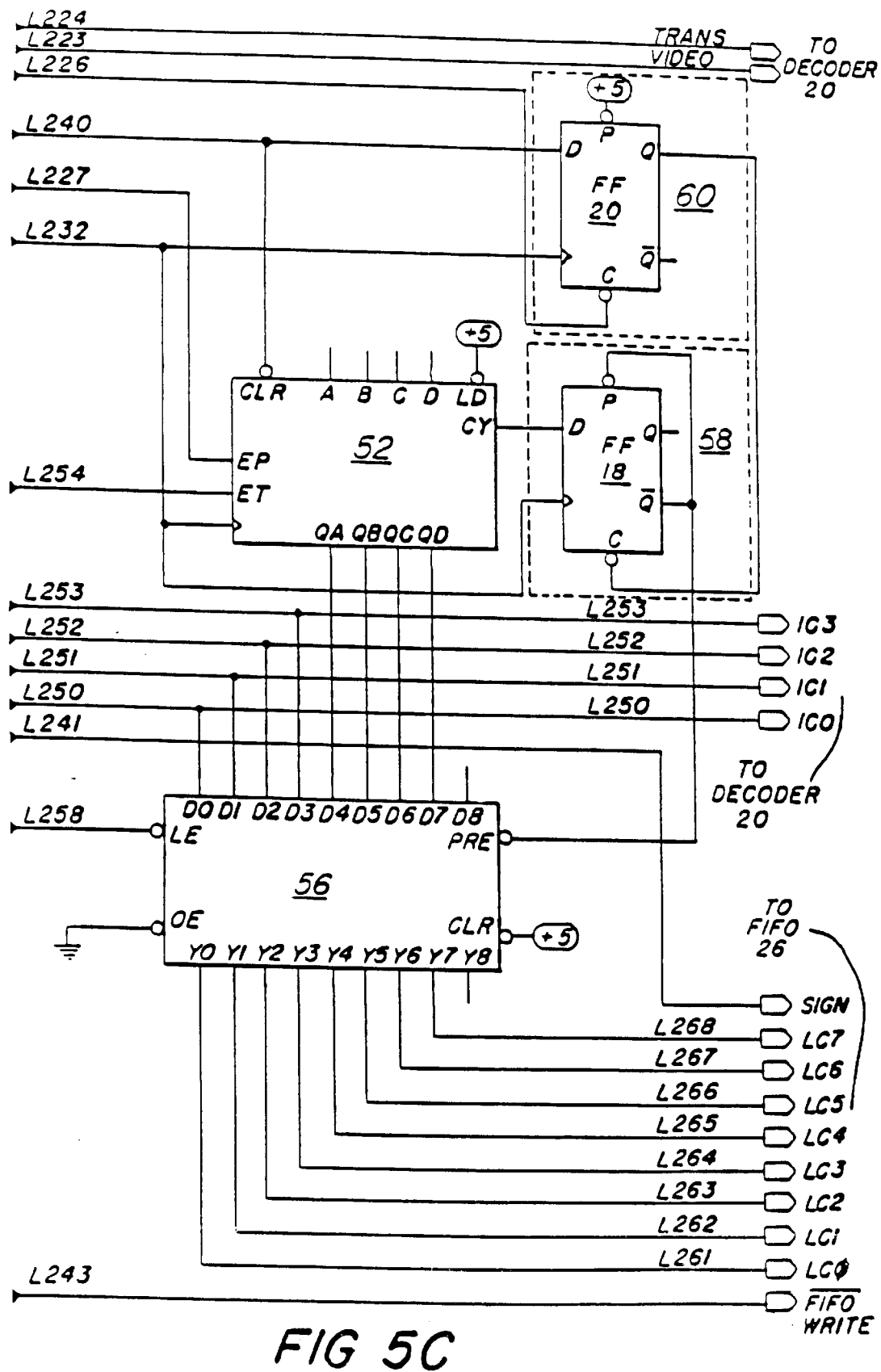
FIG. 5C is a schematic diagram of the counter which contributes the upper 4 bits of the 8 bit digitized count, the latch and the overflow and overflow reset circuitry shown in FIG. 3.

The details and operation of counters 50 and 52 will now be described with reference to FIGS. 5B and 5C. It should be noted that four high level signals are required by each counter in order for them to count input clock pulses supplied by line L232. These are the "load" and "clear" inputs and both "count enable" inputs EP and ET. Also, it should be noted that in order to present stable count data, the counters must be stopped during the operation of the main and FIFO sequencers, 42 and 44, respectively.

After sequencer count 1, $\overline{Q1}$ of main sequencer 42 is low. This signal is coupled by line L227 to both EP inputs of counters 50 and 52 and stops them from counting. After sequencer count 4, $\overline{Q4}$ of main sequencer 42 is low, this signal is coupled by line L219 to the ET input of counter 50 further disabling counters 50 and 52. Although sequencer count 5 re-establishes a high level signal on L227 from $\overline{Q1}$ output of the main sequencer 42, both counters 50 and 52 cannot count because of the previously established low level signal on line L219. After sequencer count 7, a low level signal is established on line L240 as will be described later. This affects the load and clear inputs of counters 50 and 52 respectively. Although sequencer count 8 re-establishes a high level signal on line L219 from the $\overline{Q4}$ output of the main sequencer 42, the counters still do not count because of the low level signal on line L240. Instead, they are forced to perform a load and clear function to be described later. Count 9 re-establishes the high level signal on line L240 and the counters 50 and 52 begin counting at count 10. It can be seen then that the counters are stopped between sequencer counts 2 through 9. That stoppage equals 8 clock pulses or counts in duration. To re-establish these 8 counts, the load circuit 48 is required.

The details and operation of the load circuit 48, the FIFO sequencer 44, the FIFO reset circuit 54 and the "sign" circuit 46 will now be described in conjunction with FIG. 5B.

The purpose of the load circuit 48 is to preload the counter 50 of the digitizing counting means 30 with a count of eight because, as described previously, the counter will not start to operate until after eight clock counts have occurred after a detected transition. The load circuit 48 basically comprises a NAND gate NAND 24 and a flip-flop FF8. The flip-flop FF8 generates the command signal to preload the counter 50 at sequencer count 8. Thus, the input A of NAND gate NAND 24 is connected to the $\overline{Q2}$ output of the main sequencer 42 by line L228. At count six, the $\overline{Q2}$ output goes high and therefore input A of NAND gate NAND 24 goes high. Input B of NAND gate NAND 24, which is connected to the Q4 output of the main sequencer 42 by line L231, also is high at count six. Therefore, the output of NAND 24 goes low and is connected to the D input of the flip-flop FF8. Upon the occurrence of the next clock pulse, i.e., count 7, the Q output of FF8 goes low. This enables the "load input" of the counter 50. At the next clock pulse, i.e., count 8, the counter load occurs. Accordingly, a "1" is loaded into the counter from its input D, which is connected to plus five volts. Since inputs A, B and C are grounded, "zeros" are loaded into the counter at the three lowest order bit positions. Therefore, the counter is loaded with the binary signal equivalent to decimal value 8 to make up for the eight counts which are lost during the time that the main sequencer 42 is operating. It should be noted that the low level signal on line L240 which enables the loading of the count of 8 into the counter 50 also provides the input to clear the counter 52, as will be described later when FIG. 5C is discussed. After sequencer count 8, the output of NAND gate NAND 24 goes high because line L231 from 04 of main sequencer 42 had gone low. At sequencer count 9 the counter 50 is loaded again with the binary signal equal to decimal value 8. Right after this occurs, the Q output of flip-flop FF8 goes high due to the high level signal applied to its D input from NAND gate NAND 24. This makes line L240 high and removes the "load" and "clear" signal to counters 50 and 52, respectively, completing the load circuit sequence.

The operation of the "sign" circuit 46 will now be described. The sign circuit 46 comprises a flip-flop FF10. At count 3, when the Q3 output of the main sequencer 42 goes high, that signal is provided by line L229 to flip-flop FF10. The "sign" of the previous interval (which represents the type of symbol, i.e., bar or space) appears on line L225 and is connected to the D input of flip-flop FF10. Thus, when clock input of FF10 goes high, the flip-flop operates, transferring the D input signal level to the Q output. A low level signal at the Q output of FF10 on line 241 indicates that the previous interval was a bar and a high level on L241 indicates that the previous interval was a space. As will be described later when FIG. 5C is discussed, the "sign" information on line L241 is directed to the FIFO portion of programmable processor 26.

The FIFO sequencer 44 generates a $\overline{\text{FIFO write}}$ signal which enables the FIFO portion of the programmable processor 26 to accept the count and "sign" data from the device 10. The programmable processor 26 operates asynchronously with the device 10, therefore it includes, at its input A, the heretofore mentioned FIFO memory or buffer (not shown). The FIFO sequencer 44 controls the writing of data into the FIFO buffer and basically comprises three flip-flops, FF12, FF14 and FF16, and a NOR gate NOR 6.

The operation of the FIFO sequencer 44 begins at count 4 when the Q4 output of the main sequencer 42 goes high on line L231. It continues operation for 7 clock counts thereafter, i.e., to count 11, unless interrupted by FIFO reset circuit 54. Line L231 is connected to terminal D of flip-flop FF12. After terminal D of flip-flop FF12 goes high, the next clock input causes the flip-flop to operate so that its Q output goes high. This output is connected to input A of NOR gate NOR NOR 6 and causes its output to go low. This low signal appears on line L243 and constitutes the $\overline{\text{FIFO write}}$ signal. The transfer of "count" and "sign" information to the FIFO of the programmable processor 26 takes place when line L243 becomes high again.

The $\overline{\text{FIFO write}}$ signal from NOR NOR 6 is also connected to the D input of flip-flop FF16. Upon the next clock pulse, i.e., count 6, flip-flop FF16 operates and a low signal appears at its Q output. This signal is applied to the latch 56 by line L258 and causes the activation of the latch, as will be described later. Also at count 6, the flip-flop FF14 operates, which causes its output terminal Q to go high.

In normal operation, this set of conditions continues until clock pulse 8 at which time line L231 becomes low. At the next clock pulse, i.e., clock pulse 9, this low signal is passed through FF12 to its Q output and primes FF14 for operation. At clock pulse 10, the low signal is passed through FF14 and appears at its Q output. At this time inputs A and B of NOR gate NOR gate NOR 6 are both low so its output goes high thereby ending the $\overline{\text{FIFOwrite}}$ signal on line L243. At clock pulse 11, the high signal from NOR 6 is passed through flip-flop FF16 to its Q output and on through line L258 to latch 56. This high signal de-activates the latch as will be described later. The normal FIFO sequencer 44 sequence is now complete.

The FIFO reset circuit 54 will now be described. This circuit basically comprises NAND gate NAND 26, NAND 28, NAND 30 and inverter I20. The purpose of circuit 54 is to terminate the $\overline{\text{FIFOwrite}}$ signal anytime a $\overline{\text{FIFO reset}}$ signal is applied to the circuit via line L233. It also prevents false or improper $\overline{\text{FIFOwrite}}$ signals from occurring after the $\overline{\text{FIFO reset}}$ signal is removed. Normally, the ouput from NAND gate NAND 26 is high. Line L233 which carries the $\overline{\text{FIFO reset}}$ signal is also normally high. This makes the output of NAND gate NAND 28 low. This signal is inverted by inverter I20 to produce a high output on line L246 which will allow flip-flops FF12, FF14 and FF16 to operate in a normal fashion as described previously.

NAND gate NAND 30 is connected to the main sequencer 42 by lines L230 and L219. When the main sequencer is at counts 3 through 7, the output of NAND gate NAND 30 is high by virtue of the fact that either or both of lines L230 or L219 are low at that time. To illustrate the operation of the FIFO reset 54, it will be assumed that the main sequencer 42 is at count 6. Normally a $\overline{\text{FIFO write}}$ signal on line L243 would occur at this time. If, however, a $\overline{\text{FIFO reset}}$ pulse is received on line L233 at input B of NAND 28, this action causes the output of NAND gate NAND 28 to go high. This signal as well as the high signal from the NAND 30 forces the ouput of the NAND 26 to go low which then keeps the high output of NAND 28 constant regardless of what state line L233 becomes thereafter. This action prevents a false or improper $\overline{\text{FIFO write}}$ signal from occurring if the FIFO reset signal on line L233 were immediately removed. The high signal from the NAND gate NAND 28 output is inverted by I20 so that line L246 now goes low. When this occurs, flip-flops FF12 and FF14 are reset through their clear inputs forcing both their Q outputs to go low. This in turn forces two low signals on inputs A and B of NOR gate NOR 6 which then causes its output to go high. This immediately terminates the $\overline{\text{FIFO write}}$ signal supplied by NOR gate NOR 6 on line L243.

The low signal on line L246 also is applied to the preset input of flip-flop FF16 forcing its Q output to go high. This high signal on line L258 de-activates latch 56 (FIG. 5C). The circuits 44 and 56 remain in this state until the main sequencer 42 reaches count 8. At this time, both inputs of NAND 30 are high causing its output to go low. This low is coupled to NAND gate NAND 26 and causes NAND gate NAND 26's output to go high. If at this time, line L233 is also high, i.e., no $\overline{\text{FIFO reset}}$, then both inputs to NAND gate NAND 28 will be high causing its output to go low. This signal is inverted by inverter I20 to a high, releasing the reset condition imposed on FIFO sequencer 44 through line L246. If, however, line L233 is still low, i.e., the $\overline{\text{FIFO reset}}$ signal is still active, then NAND gate NAND 28's output will be forced to continue at a high level and the reset condition imposed on circuit 44 through line L246 by inverter I20 will continue at a low level until line L233 finally does go high. At this time, the reset condition on line L246 will end.

The counter 50 outputs QA, QB, QC and QD are connected to lines L250, L251, L252 and L253, respectively. These signals represent the least significant four bits of the eight bit digital count. The "carry" output signal of counter 50 is provided on line L254. Counter 52 generates the most significant four bits of the eight bit count and operates in conjunction with the latch 56, the overflow circuit 58 and overflow reset 60. These circuits will now be descrbied with reference to Fig. 5C. The counter 52 is cleared by the low level signal appearing on line L240 when flip-flop FF 8 of the load circuit 48 is operated to enable the load input of the counter 50. The low level signal appears at count 7 of the sequence and the clearing of the counter takes place at count 8. The enable input EP of the counter 52 is enabled at count 5 when $\overline{Q1}$ of the main sequencer goes high, thereby causing a high signal to appear on line L227. The ET input is enabled by the "carry" signal on line L254 which appears at the carry output terminal CY of the counter 50. It should be noted that the load input terminal LD is not activated since it is connected to plus five volts.

The counter 52 outputs QA, QB, QC and QD are connected to inputs D4, D5, D6 and D7 of the latch 56. Normally, the latch is de-activated by a high level signal at the LE input and data passes through the latch freely from inputs D0–D7 to outputs Y0–Y7, respectively. However, when the latch is activated by a low level signal at LE, this passage is prevented and outputs Y0–Y7 are held or "latched" at the state they were in when activation took place. The outputs of the counter 50 on lines L250, L251, L252 and L253 appear at input terminals D0, D1, D2 and D3, respectively, of the latch 56. The four bit count output of counter 50, is also provided to the external fixed program decoder 20 via lines L250, L251, L252 and L253 which are connected to output terminals IC0, IC1, IC2 and IC3, respectively.

It should also be noted that the transition signal TRANS and the VIDEO signal are provided to output terminals for the decoder 20, via lines L224 and L223, respectively. The TRANS signal is the "commit" signal which occurs at count 4 of the main sequencer 42. The TRANS signal, as will be seen by reference to Fig. 5A, is provided by an output of the inverter I18. The VIDEO signal on line L223 is the signal appearing at the output terminal $\overline{Q}$ of flip-flop FF6 and it is the complement of the "sign" signal appearing on the Q output of that flip-flop. The "sign" signal to the FIFO of the programmable processor 26 is a low level signal when the symbol is a bar and a high level. signal when the symbol is a space. The VIDEO signal to the fixed program decoder 20 is a high level signal when the symbol is a bar and is a low level signal when the symbol is a space. The signal at the VIDEO input of the fixed program decoder 20 and the "sign" input to the FIFO of processor 26 indicate whether the previous transition which had just been counted was a bar or a space.

The "carry" signal of counter 52 is provided at its CY output and is connected to the D input of the flip-flop FF18 of the overflow circuit 58. When the count in counters 50 and 52 overflow, i.e., when the most significant bit at terminal QD of counter 52 changes from a one to a zero, the "carry" signal terminal of counter 52 is high. This causes flip-flop FF18 to operate, whereupon a low level signal appears at the $\overline{Q}$ output of flip-flop FF18. This signal is provided to the preset input PRE of the latch 56.

The low level signal appearing at the PRE input maintains a count of all ones on output terminals Y0–Y7 of latch 56. Thus, when the overflow circuit 58 indicates that the counters 50 and 52 have reached the maximum value of 255, that count is maintained at the output of the latch 56 and is provided to the FIFO of the programmable processor 26, when the $\overline{\text{FIFO write}}$ signal occurs. The reason for this arrangement is that the programmable processor 26 includes an eight bit microprocessor which cannot handle a count higher than 255.

The overflow reset circuit 60 operates when the flip-flop FF8 of the load circuit 48 provides a low level signal on line L240 into input D of flip-flop FF20. The next clock pulse causes flip-flop FF20 of the overflow reset circuit 60 to operate. This provides a low level signal at output terminal Q of the flip-flop FF20. The output is connected to the clear input terminal C of the flip-flop FF18. This clears the flip-flop FF18 of the overflow circuit 58 and removes the preset input from the latch 56.

The output signals Y0–Y7 on the latch 56, are directed to the FIFO in the programmable processor 26 by lines L261 to L268, respectively. As indicated previously, the FIFO receives the $\overline{\text{FIFO write}}$ signal, digital count information at terminals LC0–LC7, and a signal indicating the "sign" of the interval which has been digitized.

The device 10 may be constructed of standard commercially available parts. For example, as indicated previously, the fixed program decoder 20 can comprise the National Cash Register integrated circuit chip, type No. 6-1005415/ NCR-8415. Likewise, all other circuits of device 10, such as NAND gates, NOR gates, inverters, counters, flip-flops, etc., may comprise standard, commercially available parts or be fabricated as a custom VLSI chip(s).

As can be seen from the above the digitizer/sequencer device 10 is capable of operating with a large number of bar code inputs, including UPC code, by providing the same to a fixed program decoder, e.g., a hard wired integrated circuit chip, and UPC and other codes through a programmable data processor having a FIFO input. Further, the subject device is of wide applicability inasmuch as it can accept data from a variety of types of scanners.

Finally, as can be ascertained by one skilled in the art, although the preferred embodiments described herein describe the use of the subject apparatus 10 to process data provided from bar code scanners, whether slot type, hand-held type, light pen or wand type, etc., the apparatus may be used to process data from other "scanner" equipment which provide digital data, such as magnetic card readers. To that end, magnetic card readers or other equipment or devices that read data recorded on some medium and provide digital output signals indicative thereof are generically referred to as "scanners" herein.

Without further elaboration, the foregoing will so fully illustrate the invention that others may by applying current or future knowledge readily adapt the same for use under various conditions of service.

We claim:

1. A code symbol reading system comprising:
   (1) a first scanning device for scanning a code symbol and producing a first digital data signal having first and second signal levels of variable time duration which undergo signal level transitions in accordance with said code symbol being scanned by said first scanning device; and
   (2) a digital signal processing device capable of decoding a plurality of digital data signals, including said first digital data signal, and a second digital data signal produced as output from a second scanning device and having first and second signal levels of variable time duration which undergo signal level transitions in accordance with a code symbol being scanned by said second scanning device, said digital signal processing device including:
   (a) a plurality of data input ports, each said data input port being operably connectable to one said scanning device, for supplying one said digital data signal to one said data input port for processing;
   (b) signal level transition detection means for detecting the signal level transitions in the digital data signal supplied to any one of said plurality of data input ports, and producing signal level transition data for the supplied digital data signal;
   (c) connection means for operably connecting said data input ports to said signal level transition detection means;
   (d) common timing means for measuring the time duration of the first and second signal levels between detected signal level transitions in the supplied digital data signal, and producing digital data related to the time duration of the first and second signal levels in the supplied digital data signal;
   (e) common control means for controlling the operation of said common timing means in response to signal level transition data produced from said signal level transition detection means;
   (f) common data processing means operably associated with said common timing means and programmed for processing said digital data from the supplied digital data signal, so as to produce decoded symbol data representative of the code symbol being scanned by said scanning device producing the supplied digital signal; and
   (g) a data output port operably associated with said common data processing means and for providing the decoded symbol data to a host device operably connectable to said data output port.

2. The code symbol reading system of claim 1, wherein said plurality of data input ports comprises at least first and second data input ports, and wherein said first data input port is adapted for receiving said first digital data signal produced from said first scanning device, and wherein said first and second signal levels of said first digital data signal represent the bars and spaces, respectively, of the code symbol being scanned by said first scanning device.

3. The code symbol reading system of claim 2, wherein said second data input port is adapted for receiving said second digital data signal produced from said second scanning device, and wherein said first and second signal levels of said second digital data signal represent the bars and the spaces, respectively, of the code symbol being scanned by said second scanning device.

4. The code symbol reading system of claim 2, wherein at least one of said first and second scanning devices is selected from the group comprising countertop scanners, handheld scanners, light pen scanners and wand scanners.

5. The code symbol reading system of claim 1, wherein said common timing means comprises means for producing clock pulses at a predetermined frequency and means for counting the produced clock pulses so as to produce said digital data.

6. The code symbol reading system of claim 1 wherein said code symbols is a bar code symbol.

7. A code symbol reading system comprising:
  (1) a first scanning device for scanning a code symbol and producing a first digital data signal having first and second signal levels of variable time duration which undergo signal level transitions in accordance with said code symbol being scanned by said first scanning device; and
  (2) a digital signal processing device capable of decoding a plurality of digital data signals, including said first digital data signal and a second digital data signal produced as output from a second scanning device and having first and second signal levels of variable time duration which undergo signal level transitions in accordance with a code symbol being scanned by said second scanning device, said digital signal processing device including:
    (a) a plurality of data input ports, each said data input port being operably connectable to one said scanning device, for supplying one said digital data signal to said data input port for processing;
    (b) signal level transition detection means operably associated with each said data input port, for detecting signal level transitions in the digital data signal supplied to any one of said plurality of data input ports and producing signal level transition data associated with the supplied digital data signal;
    (c) common digital count data producing means for measuring the time duration of the first and second signal levels between detected signal level transitions in the supplied digital data signal, and producing digital data related to the time duration of the first and second levels in the supplied digital data signal;
    (d) common data processing means operably associated with said common digital count data producing means, and programmed for processing data including said digital data from the supplied digital data signal, so as to produce decoded symbol data representative of the code symbol being scanned by said scanning device producing the supplied digital signal; and
    (e) a data output port operably associated with said common data processing means and for providing the decoded symbol data to a host device operably connectably to said data output port.

8. The bar code symbol reading system of claim 7, wherein said plurality of data input ports comprises at least first and second data input ports, and wherein said first data input port is adapted for receiving said first digital data signal produced from said first scanning device, and wherein said first and second signal levels represent the bars and spaces, respectively, of the code symbol being scanned by said first scanning device.

9. The bar code symbol reading system of claim 8, wherein said second data input port is adapted for receiving said second digital data signal produced from said second scanning device, and wherein said first and second signal levels of said second digital data signal represent the bars and spaces, respectively, of the code symbol being scanned by said second scanning device.

10. The code symbol reading system of claim 9, wherein at least one of said first and second scanning devices is selected from the group comprising countertop scanners, hand-held scanners, light pen scanners and wand scanners.

11. The bar code symbol reading system of claim 8, wherein said common digital count data producing means comprises means for producing clock pulses at a predetermined frequency and means for counting the produced clock pulses so as to produce said digital data.

12. The code reading system of claim 8, wherein said plurality of data input ports, said signal level transition detection means, and said common digital count data producing means are physically realized in an integrated circuit device.

13. The code reading system of claim 8, wherein said common data processing means and said data output port are physically realized using a programmed microprocessor is operably connected to said integrated circuit device for transferring said digital data from said integrated circuit device to said programmed microprocessor for processing.

14. The code symbol reading system of claim 7, wherein said code symbol is a bar code symbol.

15. The bar code symbol reading system of claim 7, wherein said plurality of data input ports, said signal level transition detection means and said common digital count data producing means are physically realized in an integrated circuit device.

16. The bar code symbol reading system of claim 15, wherein said common data processing means and said data output port are physically realized using a programmed microprocessor, and wherein said programmed microprocessor is operably connected to said integrated circuit device for transferring said digital data from said integrated circuit device to said programmed microprocessor for processing.

17. A bar code symbol reading system comprising:
  (1) a first scanning device for scanning a code symbol and producing a first digital data signal having first and second signal levels of variable time duration which undergo signal level transitions in accordance with said code symbol being scanned by said first scanning device; and
  (2) a digital signal processing device capable of decoding a plurality of digital data signals, including said first digital data signal, a second digital data signal produced as output from a scanning device and having first and second signal levels of variable time duration which undergo signal level transitions in accordance with the bar code symbol being scanned by said second scanning device, said digital signal processing device including:
    (a) a plurality of data input ports, each said data input port being operably connectable to one said scanning device, for supplying one said digital data signal to one said data input port;

(b) common signal processing means in operable association with each said data input port, for processing the digital data signal supplied to any one of said plurality of data input ports, said common signal processing means including
  (i) signal level transition detection means for detecting the signal level transitions in the supplied digital data signal and producing signal level transition data associated with the supplied digital data signal, and
  (ii) common timing means for measuring the time duration of the first and second signal levels between detected signal level transitions in the supplied digital data signal, and producing digital data related to the time duration of the first and second signal levels in the supplied digital signal;

c) common data processing means operably associated with said common signal processing means, and programmed for processing said digital data produced from the supplied digital signal, so as to produce decoded symbol data representative of the code symbol being scanned by said scanning device producing the supplied digital signal; and (d) a data output port operably associated with said common data processing means and for providing the decoded symbol data to a host device operably connectable to said data output port.

18. The code symbol reading system of claim 17, wherein said common timing means comprises means for producing clock pulses at a predetermined frequency and means for counting the produced clock pulses so as to produce said digital data.

19. The code symbol reading system of claim 8, wherein said plurality of data input ports comprises at least first and second data input ports, and wherein said first data input port is adapted for receiving said first digital data signal produced from said first scanning device, and wherein said first and second signal levels of said first digital data signal represent the bars and spaces, respectively, of the bar code symbol being scanned by said first scanning device.

20. The code symbol reading system of claim 19, wherein said second data input port is adapted for receiving said second digital data signal produced from said second scanning device, and wherein said first and second signal levels of said second digital data signal represent the bar code symbol being scanned by said second scanning device.

21. The code symbol reading system of claim 20, wherein at least one of said first and second scanning devices is selected from the group comprising countertop scanners, handheld scanners, light pen scanners, and wand scanners.

22. The code reading system of claim 19, wherein said plurality of data input ports and said common signal producing means are physically realized in an integrated circuit device.

23. The code reading system of claim 22, wherein said common data processing means and said data output port are physically realized using a programmed microprocessor, and wherein said programmed microprocessor is operably connected to said integrated circuit device for transferring said digital data from said integrated circuit device to said programmed microprocessor for processing.

24. The code symbol reading system of claim 17, wherein said code symbol is a bar code symbol.

25. The code symbol reading system of claim 24, wherein said plurality of data input ports comprises at least first and second data input ports, and wherein said first data input port is adapted for receiving said first digital data signal produced from said first scanning device, and said first and second signal levels of said first digital data signal represent the bars and spaces, respectively, of the code symbol being scanned by said first scanning device.

26. The code symbol reading system of claim 25, wherein said second data input port is adapted for receiving said second digital data signal produced from said second scanning device, and wherein said first and second signal levels of said second digital data signal represent the bar code symbol being scanned by said second scanning device.

27. The code symbol reading system of claim 26, wherein at least one of said first and second scanning devices is selected from the group comprising countertop scanners, handheld scanners, light pen scanners and wand scanners.

28. The code reading system of claim 26, wherein said plurality of data input ports, said clock signal generating means, said timing means, and said common data producing means are physically realized in an integrated circuit device.

29. The code reading system of claim 28, wherein said common data processing means and said data output port are physically realized using a programmed microprocessor, and wherein said programmed microprocessor is operably connected to said integrated circuit device for transferring said digital data from said integrated circuit device to said programmed microprocessor for processing.

30. The code symbol reading system of claim 25, wherein said code symbol is a bar code symbol.

31. The code reading system of claim 17, wherein said plurality of data input ports and said common signal processing means are physically realized in an integrated circuit device.

32. The code reading system of claim 31, wherein said common data processing means and said data output port are physically realized using a programmed microprocessor, and wherein said programmed microprocessor is operably connected to said integrated circuit device for transferring said digital data from said integrated circuit device to said programmed microprocessor for processing.

33. A code symbol reading system comprising:
  (1) a first scanning device for scanning a bar code symbol and producing a first digital data signal having first and second signal levels of variable time duration which undergo signal level transitions in accordance with said code symbol being scanned by said first scanning device; and
  (2) a digital signal processing device capable of decoding a plurality of digital data signals, including said first digital data signal, a second digital data signal produced as output from a second scanning device and having first and second signal levels of variable time duration which undergo signal level transitions in accordance with the code symbol being scanned by said second scanning device, said digital signal processing device including:
    (a) a plurality of data input ports, each said data input port being operably connectable with one said scanning device for supplying one said digital data signal to one said data input port for processing;
    (b) clock signal generating means for generating a plurality of predetermined clock signals, each said predetermined clock signal having a frequency which is suitable for use in measuring the time duration of the first and second levels of at least one of said digital data signals;
    (c) timing means for measuring the time duration of each of said first and second levels of the supplied digital data signal using one of said plurality of predetermined clock signals and producing digital data representing said measured time durations;

(d) common data processing means operably associated with said timing means and programmed for processing said digital data from the supplied digital data signal, so as to produce decoded symbol data representative of the bar code symbol being scanned by said scanning device producing the supplied digital signal; and (e) data output port operably associated with said common data processing means, for providing the decoded symbol data to a host device operably connectable to said data output port.

34. The code reading system of claim 33, wherein said plurality of data input ports, said clock signal generating means, said timing means, and said common data producing means are physically realized in an integrated circuit device.

35. The code reading system of claim 34, wherein said common data processing means and said data output port are physically realized using a programmed microprocessor is operably connected to said integrated circuit device for transferring said digital from said integrated circuit device to said programmed microprocessor for processing.

36. A code symbol reading system comprising:

(1) a first scanning device for scanning a code symbol and producing a first digital data signal having a first and second signal levels of variable time duration which undergo signal level transitions in accordance with said code symbol being scanned by said first scanning device; and (2) a digital signal processing device capable of decoding a plurality of digital signals including said first digital signal and a second digital signal produced as output from a magnetic medium scanning device and having first and second signal levels which undergo signal level transitions in accordance with the digital code being scanned by said magnetic medium scanning device, said digital signal processing device including:

(a) first and second data input ports, wherein said first data input port is operably connectable to said code symbol scanning device for supplying said first digital data signal to said first data input port for processing, and wherein said second data input port is operably connectable to said magnetic medium scanning device for supplying said second digital data signal to said second data input port for processing;

(b) said common digital signal processing means operably connected to said first and second data input ports, said common digital signal processing means including (i) transition detection means for detecting the signal level transitions in the digital data signal being supplied to said common digital signal processing means, and producing signal level transition data associated with the supplied digital data signal, (ii) signal level detection means for detecting the signal level between detected signal level transitions in the supplied digital signal, and producing digital data related to detected signal level in the supplied digital signal, and (iii) control means for controlling the operation of said signal level detection means in response to the signal level transition data produced from said signal transition detection means;

(c) common data processing means operably associated with said common digital signal processing means, and programmed for processing the digital data produced from the supplied digital signal, so as to produce decoded symbol data representative of said code symbol when said code symbol scanning device provides the supplied digital data signal, and produces decoded symbol data representative of said digital code when said magnetic medium scanning device provides the digital data signal; and (d) a data output port operably associated with said common data processing means, for providing the decoded symbol data to a host device operably connectable to said data output port.

37. The bar code symbol reading system of claim 36, wherein said bar code scanning device is selected from the group comprising countertop scanners, handheld scanners, light pen scanners, and wand scanners.

38. The code reading system of claim 37, wherein said plurality of data input ports and said common digital signal processing means are physically realized in an integrated circuit device.

39. The code reading system of claim 38, wherein said common data processing means and said data output port are physically realized using a programmed microprocessor, and wherein said programmed microprocessor is operably connected to said integrated circuit device for transferring said digital data from said integrated circuit device to said programmed microprocessor for processing.

40. The code symbol reading system of claim 36, wherein said code symbol is a bar code symbol.

41. The code symbol reading system of claim 40, wherein said plurality of data input ports, said signal level transition detection means, said connection means, said common timing means, and said common control means are physically realized in an integrated circuit device.

42. The code symbol reading system of claim 41, wherein said common data processing means and said data output port are physically realized using a programmed microprocessor, and wherein said programmed microprocessor is operably connected to said integrated circuit device for transferring said digital data from said integrated circuit device to said programmed microprocessor for processing.

43. The bar code symbol reading system of claim 42, wherein said plurality of data input ports, said signal level transition detection means, said connection means, said common timing means, and said common control means are physically realized in an integrated circuit device.

44. The code symbol reading system of claim 43, wherein said common data processing means and said data output port are physically realized using a programmed microprocessor, and wherein said programmed microprocessor is operably connected to said integrated circuit device for transferring said digital data from said integrated circuit device to said programmed microprocessor for processing.

45. The code reading system of claim 36, wherein said first and second data input ports and said common digital signal processing means are physically realized in an integrated circuit device.

46. The code reading system of claim 45, wherein said common data processing means and said data output port are physically realized using a programmed microprocessor, and wherein said programmed microprocessor is operably connected to said integrated circuit device for transferring said digital data from said integrated circuit device to said programmed microprocessor for processing.

* * * * *